US011361401B2

United States Patent
Tu et al.

(10) Patent No.: US 11,361,401 B2
(45) Date of Patent: Jun. 14, 2022

(54) GPU-BASED DATA JOIN

(71) Applicant: UNIVERSITY OF SOUTH FLORIDA, Tampa, FL (US)

(72) Inventors: Yicheng Tu, Tampa, FL (US); Ran Rui, Temple Terrace, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 53 days.

(21) Appl. No.: 16/629,458

(22) PCT Filed: Apr. 12, 2018

(86) PCT No.: PCT/US2018/027233
§ 371 (c)(1),
(2) Date: Jan. 8, 2020

(87) PCT Pub. No.: WO2019/018026
PCT Pub. Date: Jan. 24, 2019

(65) Prior Publication Data
US 2021/0133917 A1 May 6, 2021

Related U.S. Application Data

(60) Provisional application No. 62/535,059, filed on Jul. 20, 2017.

(51) Int. Cl.
*G06T 1/20* (2006.01)
*G06T 1/60* (2006.01)
*G06F 9/48* (2006.01)

(52) U.S. Cl.
CPC ............... *G06T 1/60* (2013.01); *G06T 1/20* (2013.01); *G06F 9/4881* (2013.01)

(58) Field of Classification Search
CPC ............... G06F 9/4881; G06F 16/2255; G06F 16/2456; G06T 1/20; G06T 1/60
USPC .................................................. 345/501, 530
See application file for complete search history.

(56) References Cited

U.S. PATENT DOCUMENTS

| 7,664,907 B1* | 2/2010 | Hutsell | ............... G06F 13/1626 |
| | | | 711/104 |
| 2009/0307660 A1 | 12/2009 | Srinivasan | |
| 2013/0117305 A1 | 5/2013 | Varakin | |
| 2014/0153826 A1* | 6/2014 | Gnedin | ..................... G06T 7/41 |
| | | | 382/168 |
| 2015/0269168 A1 | 9/2015 | Lysne et al. | |
| 2016/0055206 A1 | 2/2016 | Becerra et al. | |

(Continued)

OTHER PUBLICATIONS

International Search Report for PCT/US18/27233 dated Sep. 7, 2018.

(Continued)

*Primary Examiner* — Jacinta M Crawford
(74) *Attorney, Agent, or Firm* — Quarles & Brady LLP

(57) ABSTRACT

Disclosed are various embodiments for performing a join operation using a graphics processing unit (GPU). The GPU can receive input data including sequences or tuples. The GPU can initialize a histogram in a memory location shared by threads. The GPU can build the histogram of hash values for the sequences. The GPU can reorder the sequences based on the histogram. The GPU can probe partitions and store the results in a buffer pool. The GPU can output the results of the join.

12 Claims, 17 Drawing Sheets

(56) References Cited

U.S. PATENT DOCUMENTS

2016/0283556 A1   9/2016 Varakin et al.

OTHER PUBLICATIONS

Yang, et al. "Relational joins on graphics processors," in Procs. of SIGMOD, 2008, pp. 511-524.
Kim, et al. "Sort vs Hash Revisited: Fast Join Implementation on Modern Multi-Core CPUs", VLDB Aug. 24-28, 2009. Lyon, France.
He, et al. "Revisiting Co-Processing for Hash Joins on the Coupled CPU-GPU Architecture", Proceedings of the VLDB Endowment, vol. 6, No. 10, 2013.
Boyer, Michael "Improving Resource Utilization in Heterogeneous CPU-GPU Systems", A Dissertation Presented to the Faculty of the School of Engineering and Applied Science, University of Virginia, May 2013. Uploaded in 2 separate parts due to size.
Bakkum, et al. "Accelerating SQL Database Operations on a GPU with CUDA", CPCPU-3, Mar. 14, 2010, Pittsburg, PA.
He, Bingsheng, et al. "Relational query coprocessing on graphics processors." ACM Transactions on Database Systems (TODS) 34.4 (2009): 1-39.
Sun, Chengyu, Divyakant Agrawal, and Amr El Abbadi. "Hardware acceleration for spatial selections and joins." Proceedings of the 30th VLDB Conference, Toronto, Canada 2004.
Bandi, Nagender, et al. "Hardware acceleration in commercial databases: A case study of spatial operations." Proceedings of the Thirtieth international conference on Very large data bases—vol. 30. VLDB Endowment, 2004.
Govindaraju, Naga K., et al. "Fast computation of database operations using graphics processors." ACM SIGGRAPH 2005 Courses. 2005. 206-es.
Sitaridi, Evangelia A., and Kenneth A. Ross. "Ameliorating memory contention of OLAP operators on GPU processors." Proceedings of the Eighth International Workshop on Data Management on New Hardware. 2012.
Yuan, Yuan, Rubao Lee, and Xiaodong Zhang. "The Yin and Yang of processing data warehousing queries on GPU devices." Proceedings of the VLDB Endowment 6.10 (2013): 817-828.
Rui, Ran, Hao Li, and Yi-Cheng Tu. "Join algorithms on GPUs: A revisit after seven years." 2015 IEEE International Conference on Big Data (Big Data). IEEE, 2015.
Odeh, Saher, et al. "Merge path-parallel merging made simple." 2012 IEEE 26th International Parallel and Distributed Processing Symposium Workshops & PhD Forum. IEEE, 2012.
Green, Oded, Robert McColl, and David A. Bader. "GPU merge path: a GPU merging algorithm." Proceedings of the 26th ACM international conference on Supercomputing. 2012.
Blanas, Spyros, Yinan Li, and Jignesh M. Patel. "Design and evaluation of main memory hash join algorithms for multi-core CPUs." Proceedings of the 2011 ACM SIGMOD International Conference on Management of data. 2011.
Balkesen, Cagri, et al. "Main-memory hash joins on multi-core CPUs: Tuning to the underlying hardware." 2013 IEEE 29th International Conference on Data Engineering (ICDE). IEEE, 2013.
Albutiu, Martina-Cezara, Alfons Kemper, and Thomas Neumann. "Massively parallel sort-merge joins in main memory multi-core database systems." arXiv preprint arXiv:1207.0145 (2012).
Manegold, Stefan, Peter Boncz, and Martin Kersten. "Optimizing main-memory join on modern hardware." IEEE Transactions on Knowledge and Data Engineering 14.4 (2002): 709-730.
Balkesen, Cagri, et al. "Multi-core, main-memory joins: Sort vs. hash revisited." Proceedings of the VLDB Endowment 7.1 (2013): 85-96.
Barber, Ronald, et al. "Memory-efficient hash joins." Proceedings of the VLDB Endowment 8.4 (2014): 353-364.
Wu, Haicheng, et al. "Red fox: An execution environment for relational query processing on gpus." Proceedings of Annual IEEE/ACM International Symposium on Code Generation and Optimization. 2014.
Kaldewey, Tim, et al. "GPU join processing revisited." Proceedings of the Eighth International Workshop on Data Management on New Hardware. 2012.
Tu, Yi-Cheng, et al. "Data management systems on gpus: Promises and challenges." Proceedings of the 25th International Conference on Scientific and Statistical Database Management. 2013.
Lee, Victor W., et al. "Debunking the 100X GPU vs. CPU myth: an evaluation of throughput computing on CPU and GPU." Proceedings of the 37th annual international symposium on Computer architecture. 2010.
Zagha, Marco, and Guy E. Blelloch. "Radix sort for vector multiprocessors." Proceedings of the 1991 ACM/IEEE conference on Supercomputing. 1991.

* cited by examiner

FIG. 5

Default Work Flow

Pipelined Work Flow Using CUDA Stream

GPU-BASED DATA JOIN

CROSS REFERENCE TO RELATED APPLICATIONS

This application is the 35 U.S.C. § 371 national stage application of PCT Application No. PCT/US2018/027233, filed Apr. 12, 2018, where the PCT claims priority to U.S. Provisional Application Ser. No. 62/535,059, filed Jul. 20, 2017, both of which are herein incorporated by reference in their entireties.

GOVERNMENT LICENSE RIGHTS

This invention was made with government support under IIS1253980 awarded by the National Science Foundation. The Government has certain rights in the invention.

BACKGROUND

In the past few years, in addition to the computing capacity that has grown exponentially, graphics processing units (GPUs) have undergone a dramatic evolution in hardware architecture and software environment. On the other hand, existing join algorithms are designed for earlier GPU architectures. Therefore it is not clear whether they can make the most out of latest devices in the market. Although the GPU code may scale well with the increasing amount of computing resources in newer GPU devices, maximum performance cannot be achieved without optimization towards new GPU components and features in the runtime system software.

SUMMARY

A system can include a central processing unit and a graphics processing unit, which can be communicably coupled together. The graphics processor can be configured to receive input data including tuples or sequences, initialize a histogram in a memory location shared by various threads, build the histogram of hash values for the sequences, reorder the sequences based on the histogram, perform a probe using partitions using the threads, store outputs corresponding to the probe from the threads in global memory, and transmit the result of the join operation to the central processing unit based on the outputs.

A method of performing a data join in a graphics processing unit can include receiving input data in the form of tuples or sequences, initializing a histogram in a memory location shared by threads, building a histogram of hash values for the sequences, reordering the sequences based on the histogram, performing a probe using partitions in the threads, storing outputs corresponding to the probe from the threads into a buffer pool in global memory, and outputting the result of the join operation based on the outputs.

A system can include a central processing unit and a graphics processing unit, which can be communicably coupled to each other. The graphics processing unit can be configured to receive input data including tuples or sequences, and generate partitions from the sequences, sort the partitions in various threads. The threads can store outputs in a shared memory to generate sorted sub-arrays. The graphics processing unit can be configured to merge the sorted sub-arrays in parallel using threads in order to generate a single sorted array, and transmit the result of the join operation to the central processing unit based on the single sorted array.

BRIEF DESCRIPTION OF THE DRAWINGS

For a more complete understanding of the embodiments and the advantages thereof, reference is now made to the following description, in conjunction with the accompanying figures briefly described as follows:

FIG. 5 illustrates a diagram of a portion of a joining process according to various example embodiments.

Figure 1:
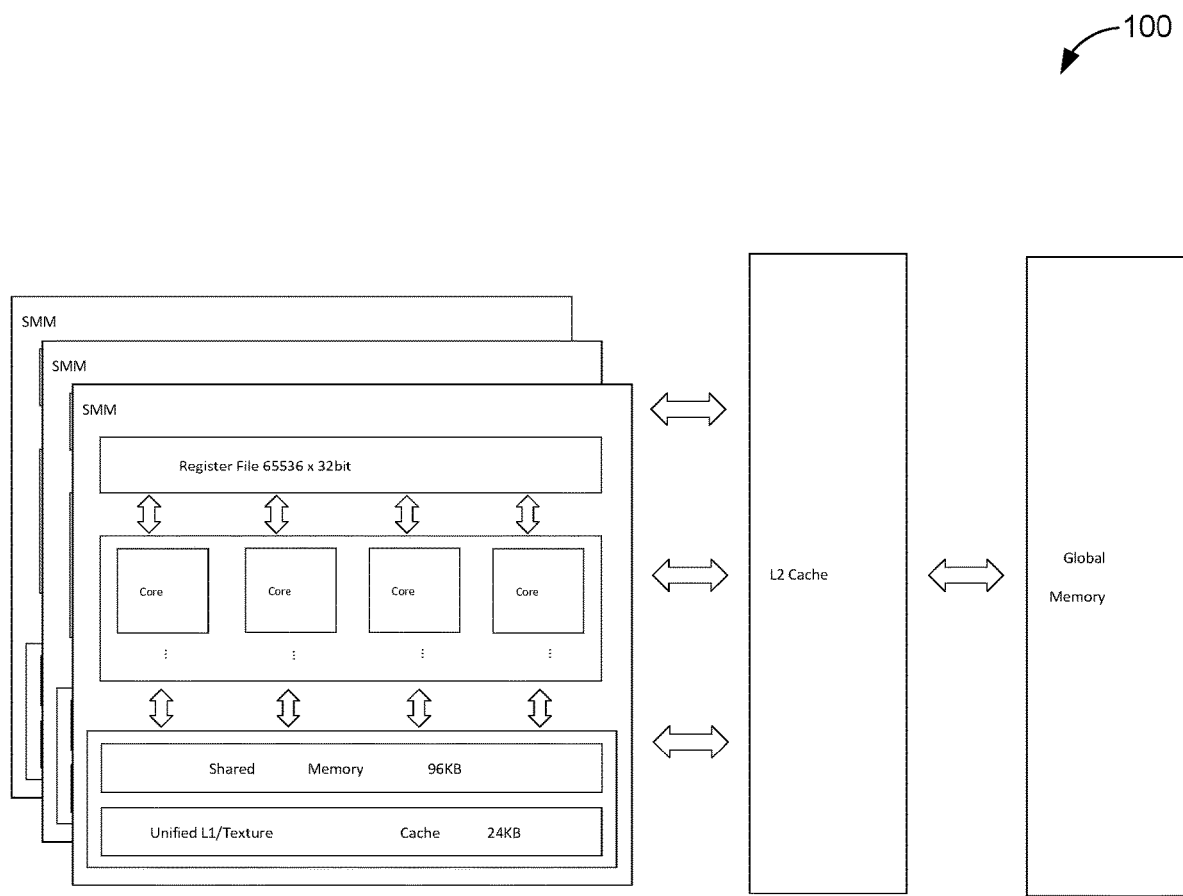
FIG. 1 is a drawing of a computing environment according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Among embodiments, some aspects of the present disclosure are implemented by a computer program executed by one or more processors, as described and illustrated. As would be apparent to one having ordinary skill in the art, the present disclosure may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The systems and methods are capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Processing relational joins on modern GPUs has attracted much attention in the past few years. With the rapid development on the hardware and software environment in the GPU world, the existing methods of performing joins in a GPU were designed for earlier architecture and cannot make the most out of latest GPU products. A new design and implementation of join algorithms with high performance under modern GPGPU environments. The new design and implementation of join algorithms are a component of our scientific database engine named G-SDMS. In particular, we overhaul the popular radix hash join and redesign sort-merge join algorithms on GPUs by applying a series of techniques to utilize the hardware capacity of latest Nvidia GPU architecture and new features of the CUDA programming framework. Our algorithms take advantage of revised hardware arrangement, a larger register file and shared memory, native atomic operation, dynamic parallelism, and CUDA Streams among other aspects.

According to one embodiment, our experiments showed that our new hash join algorithm can be between 2.0 to 14.6 times as efficient as existing GPU implementation, while the new sort-merge join can achieved a speedup of 4.0 to 4.9 times. Compared to the best CPU sort-merge join and hash join known to date, our optimized code can achieve up to 10.5 times and 5.5 times speedup. Moreover, in some embodiments, the improved join methods can extend to scenarios where large data tables cannot fit the GPU memory.

The multitude of modern parallel computing platforms can facilitate improvements to data management systems and applications. While CPUs are still the most popular platform for implementing database management systems (DBMSs), GPUs can be utilized in doing the same due to their computing power, high level of parallelization, and affordability. According to one example, GPU-based data management named G-SDMS can be utilized to improve database performance using a GPU. In particular, G-SDMS can include join methods focused on design and implementation of relational join algorithms. The join methods can include GPU-based join code that significantly outperform those available in the market.

In some embodiments, a two-pass radix partitioning strategy can be used to reorganize the input relations. In order to increase hardware utilization, a shared histogram can be stored in the shared memory for each thread block and all threads in the same block update the shared histogram via atomic operations. The shared histogram can reduce the usage of shared memory per thread, which can allow for more concurrent threads working together. Multiple works can be assigned per thread by loading more data into the large register file in the new GPU architecture. By assigning multiple works per thread, each individual thread improves instruction-level parallelism and higher overall efficiency can be achieved.

Previous joins required two scans of the inputs before writing the output to memory. To remove this large overhead, an output buffer manager can be used to enable probing with only one pass. With the help of efficient atomic operations, threads can acquire the next available slot from the global buffer pointer and output independently. Dynamic Parallelism can be used to dynamically invoke additional threads to tackle with skewed partitions without additional synchronization and scheduling efforts. In some embodiments, a sort-merge join algorithm can be used that utilizes registers to allow more work per thread.

The join methods can improve efficiency by using an efficient parallel merge step, such as Merge Path, in both sort and merge stages. The merge process can partition the data in such a way that threads can work independently with balanced load. With a linear total work efficiency, the disclosed merge process can merge faster than traditional parallel merge algorithm that requires a binary search for each tuple.

The sort process can be designed in a hierarchical manner. First, each thread can sequentially sort its own chunk of data in a register. Then, all the threads in the same block can work together to merge their data into a list staying in shared memory. After that, all the thread blocks can combine their data in global memory. This method can make full use of the memory hierarchy of the GPU, especially the register file and shared memory. The design can also be extended to scenarios with large tables that cannot fit into the GPU global memory. The overlap can be maximized for the transmission of partitions of input tables and the processing of resident data. In one example, by using CUDA streams, a single workflow can be divided into two pipelines so that input data transfer and kernel execution can overlap.

In one example, statistics provided by CUDA Visual Profiler show that the join methods discussed herein can achieve much higher multiprocessor occupancy, higher shared memory bandwidth utilization and better cache locality. Compared with the latest CPU code, the hash join method and sort-merge join method can be up to 5.5× and 10.5× as fast. When handling data larger than the GPU device memory size, the join methods can achieve 3.6-4.3× and 11-12.8× speedup for hash join and sort-merge join respectively.

The GPU-based join algorithms can be designed and implemented by optimizing various stages of sort merge and hash joins on the latest GPU architecture. When compared with previous GPU join algorithms, the join methods can achieve a large speedup and the utilization of GPU resources can increase considerably. The design of GPU joins can reduce I/O overhead in dealing with input tables that cannot be stored in GPU memory. An anatomy of the algorithms uses are provided to interpret the observed results.

Turning now to the drawings, exemplary embodiments are described in detail. With reference to FIG. 1, shown is an example architecture 100 with various components of the GPGPU environment according to various embodiments of the present disclosure. A GPU architecture is illustrated that includes a highlight of hardware and software features that are most relevant to join processing. Based on that, a GPU hash and sort-merge join algorithms are presented that take advantage of such features to effectively utilize GPU resources.

In this example, the NVidia GPU devices and the CUDA programming model are shown. CUDA is a parallel computing platform provided by Nvidia. For example, the architecture 100 can represent a layout of a Maxwell architecture as shown in FIG. 1. The architecture 100 can include a Maxwell GPU chip with one or more multiprocessors. In one embodiment, the GPU chip can include 128 computing cores, a large register file, shared memory, and cache system. In CUDA, the threads can be grouped into thread blocks. Each block can run on one multiprocessor, and 32 threads form a basic scheduling unit called a warp. A block may contain several warps.

The threads can be scheduled in a Single Instruction, Multiple Data (SIMD) manner, where a warp of threads always execute the same instruction but on different data at the same time. The memory hierarchy in the GPU can also have different scopes. The variables of a thread can be stored in the register file and can be private to that thread. However, CUDA can provide shuffle instructions that allow threads in the same warp to shared data in the registers. At block level, shared memory can be a programmable L1-level cache that can be used for fast data sharing among threads in the same block. The global memory or device memory can serve as the main memory for GPU. Although the GPU can provide up to a few hundred GB/s of bandwidth, coalesced memory access is needed to fully utilize the bandwidth. The GPU also includes an L2 cache that buffers the global memory access for the multiprocessors.

The hardware designs of GPUs have experienced drastic changes in recent years. The number of computing cores has increased steadily, giving rise to much higher GFLOPs of the GPU. The Titan X has nearly 30× more cores than that in 8800GTX, but CPU core counts only increase by 4-5× during the same period of time. Apart from the number, the organization of the multiprocessor has also changed over time. One multiprocessor in Maxwell now consists of 128 computing cores which are divided into four blocks. Each block of cores has a dedicated scheduler with dual issue capability. This benefits the efficiency of scheduling, power consumption, and chip area, but requires more parallelism to achieve high utilization.

An important change is the large number of registers starting from Kepler architecture. Each multiprocessor has 64K 32-bit registers, resulting in 256 KB capacity, which is larger than that of L1-level cache. This capacity means the register file can hold a larger amount of data, hence more work per thread is made possible at register speed. Data in registers had been set to be private to each thread, but now they can be shared among threads within the same warp via shuffle instructions. Atomic operations are widely used in parallel algorithms to operate on shared data or to gather results. In early GPUs, atomic operations are supported via a locking mechanism. Native atomic operations can improve the efficiency in global memory and the affected memory addresses are aggressively cached (in L2 cache). The native atomic operations can be supported in shared memory. The use of native atomic operations in shared memory can simplify applications that need to update shared counters or pointers, and more importantly, can relieve a major performance bottleneck associated with atomic operations due to the high bandwidth of shared memory.

Dynamic parallelism can also be used to improve efficiency. Dynamic parallelism allows an active kernel to launch other kernel calls, thus dynamically creating additional workload when the parent kernel is running. This feature enables recursive kernel calls which is not possible in earlier generations of GPUs. Dynamic parallelism can be used to tackle the data skewness problem in hash join.

Creating overlaps between the processing of in situ data and shipping of new data inputs/outputs is a technique in joining large tables. Such concurrency of different activities can be achieved by a CUDA mechanism called CUDA stream. In some embodiments, the input tables can be completely placed in global memory, but in others the input cables cannot be completely placed in global memory.

The hash join process includes of three parts: partitioning input data, building hash table, and probing. By reordering the tuples in a relation according to its hash value, the partitioning and building stages can be combined into one. Therefore, the tuples with the same hash value can be clustered into a continuous memory space, which ensures coalesced memory access when threads load data from a certain partition.

Figure 2:
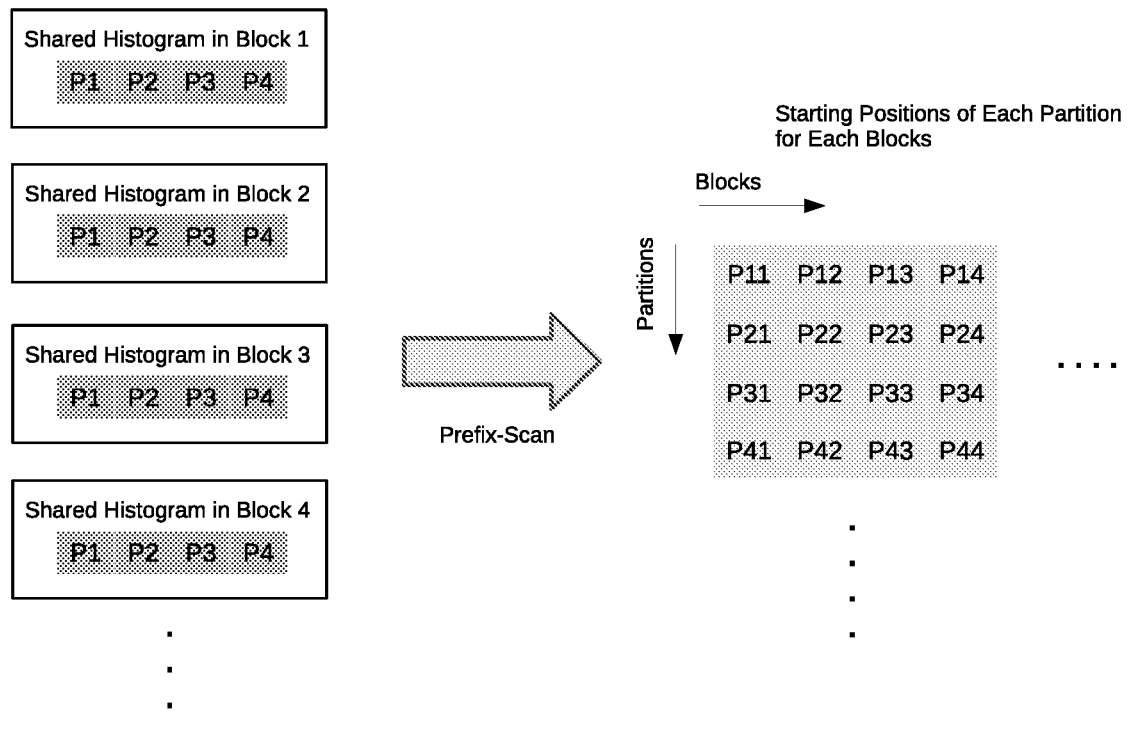
FIG. 2 illustrates a diagram of a portion of a joining process according to various example embodiments.

The partitioning stage of the hash join process can start with building histograms for hash values to reorder the tuples of both input tables. In previous work, a thread reads and processes one tuple at a time because the multiprocessor has very few registers. This method is straightforward but is less capable of hiding latency via instruction-level parallelism. To utilize the large register file in new GPU architecture, the hash join process can load values per thread (VT) tuples into registers of the thread all at once so that each threads are assigned more workload at the beginning. This increases the instruction-level parallelism within each thread, and the memory access can be overlapped with computation to hide latency. Each thread processes its own data independently and updates the shared histogram in shared memory, as shown in FIG. 2. In contrast to each thread keeping private histograms for each partition in shared memory, the join process can keep only one shared copy of histogram in each thread block, as Algorithm 1 shows below.

In early generation of GPUs, atomic operations were either not supported or involved considerable overhead. It was not feasible to update shared histogram among a number of threads. The problem with keeping private histograms in each thread is that it would consume too much shared memory when either the number of threads in each block or the number of partitions is high, reducing the number of active threads running on each multiprocessor (i.e., called occupancy). This might not be a serious issue in old devices such as 8800GTX. Since they only have 8 cores per multiprocessor, a small number of threads are enough to keep it busy. However in newer architectures, more concurrent threads are required to keep the hardware at optimal performance.

By using one shared copy of the histogram, the amount of shared memory consumed by a block can be reduced by a factor that equals the block size, and is no longer depending on the number of threads in a block, resulting in more active threads for multiprocessors. Also, thanks to native atomic operation support on shared memory, all the threads in a block can update the shared histograms with a very small overhead.

Algorithm 1: Histogram in GPU Hash Join

Require: Relation R
Ensure: array of histograms SharedHisto[ ]
1:  Initialize SharedHisto[nPartitions] to 0;
2:  data[VT] ← load VT tuples from relation R;
3:  for i = 0 to VT-1 do
4:    h ← Hash(data[i].key);
5:    atomicAdd(SharedHisto[h], 1);
6:  end for
7:  Write SharedHisto[nPartitions] to global memory;

A multi-pass radix or a variable number of pass partition could be used. However in this method, there is a non-linear growth of number of partitions with the table size increasing. This results in a non-linear execution time increase. A two-pass radix partition mechanism can be adopted. The partition size can be kept small enough (e.g., less than 512 tuples for each thread block) to fit into shared memory, therefore the probe stage only needs to read the data once from the global memory. To achieve such small partition for large input, a large number of partitions can be created. If a single-pass method is used, the shared memory is not able to hold that many histograms. Thus, a two-pass method can be used where the first pass reorganizes the input into no more than 1024 partitions and the second pass further divide the partitions from the first pass into smaller ones. By using this method, in one example, a single table can be processed containing 500 million integer (key,value) pairs. In this example, this is a reasonable size since in our experiments the Titan X with 12 GB memory can hold two 128 million-tuple arrays with their intermediate data structures.

To reorder the tuples as shown in Algorithm 2, each thread block needs to know its starting positions of the partitions. The shared histograms can be copied to global memory, and then a prefix scan can be performed to determine the starting position of all the partitions for each block, as shown in FIG. 2. Once the positions are obtained, all the threads can reorder the tuples in parallel by atomically incrementing the pointers for each partition. Since the join method can use shared histogram and its prefix sum, the writing positions of the threads in the same block can be clustered to several contiguous spaces. This increases locality of memory access, thus the cache would be in use to buffer the writes.

Algorithm 2: Reorder in GPU Hash Join

Figure 3:
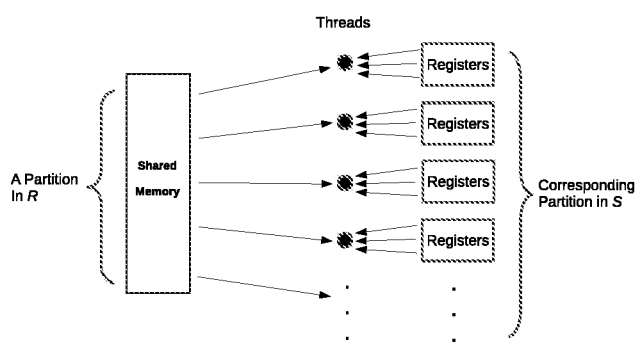
FIG. 3 illustrates a diagram of a portion of a joining process according to various example embodiments.

Input: relation R
Output: reordered relation R'
1:  SharedHisto[nPartitions] ← load the exclusive prefix sum of the histogram from global memory;
2:  Synchronize;
3:  data[VT] ← load VT tuples from relation R;
4:  for i = 0 to VT-1 do Algorithm 2: Reorder in GPU Hash Join 5:    h ← Hash(data[i].key);
6:    //get current writing position and then increment
7:    pos ← atomicAdd(SharedHisto[h],1);
8:    R'[pos] ← data[i];
9:  end for In the probe stage, as illustrated in FIG. 3, each partition of input table R can be loaded into shared memory by one block of threads. A partition of the other table S with the same hash value can be loaded into registers by the same threads. Every access to partitions of S can be at register speed. To write the outputs back to memory, the probe can be performed twice. The first probe can return the number of outputs for each partition to determine the location of the output buffer for writing outputs. The total number of outputs and starting position of each partition can be obtained by a prefix scan of these numbers. Given the number of outputs, the output array can be allocated and then the second probe can be performed to actually write the output tuples. This scheme eliminates the overhead of synchronization and dynamic allocation of buffers and efficiently outputs in parallel by doing more work. The pseudo-code of such a design of probe is shown in Algorithm 3.

Figure 4:
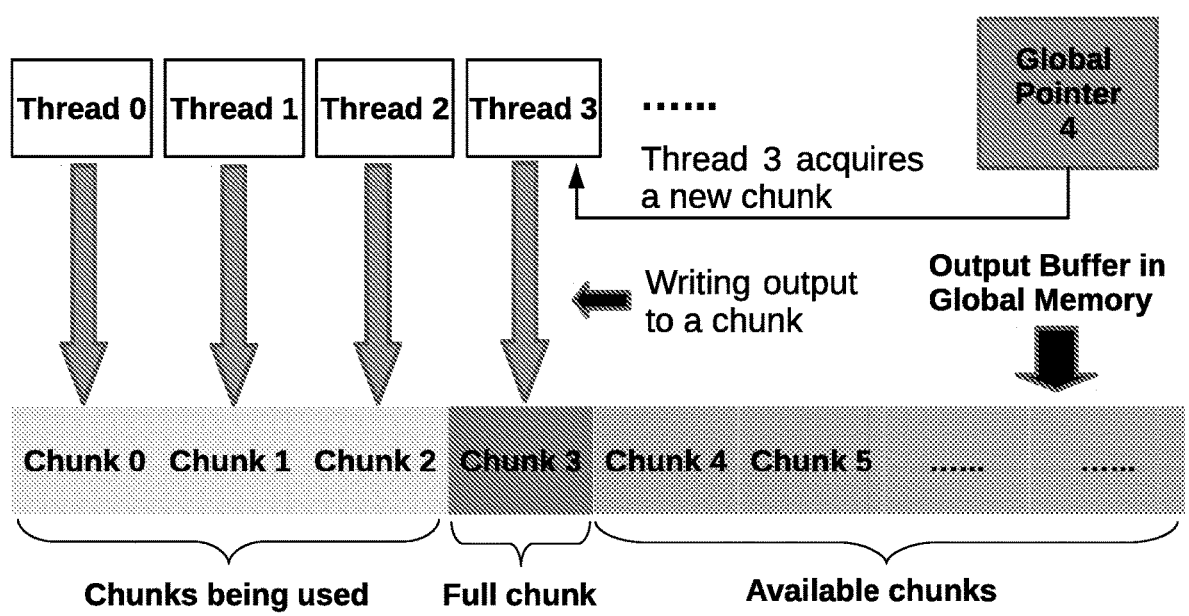
FIG. 4 illustrates a diagram of a portion of a joining process according to various example embodiments.

The overhead of probing twice can be high, and thus removing a second probe is advantageous. To reduce such overhead, a buffer management mechanism can be utilized in which threads directly output to different locations of a buffer pool in global memory as shown in FIG. 4. An output buffer pool of size B can be allocated and divided into small pages of size b. A global pointer P can hold the position of the first available page in the buffer pool. Each thread can start with one page and fill the page with output tuples by keeping its own pointer to empty space in the page. Once the page is filled, the thread can acquire a new page pointed to by P via an atomic operation and increment P. With the direct output buffer, threads can output directly in the probe stage in parallel and no complex synchronization is needed.

The cost of acquiring new pages can be exchanged for elimination of the second probe. Since the atomic operation only happens when a page is filled, few conflicts can be expected in accessing the global pointer P. Plus, the page size b can be adjusted to reach the desirable tradeoff between such overhead and buffer space utilization (i.e., larger page can reduce overhead but may render more empty space within pages). To tune the output buffer even more aggressively, an alternative embodiment includes dividing the whole output buffer into chunks. Each thread block can be assigned one chunk to output its results. Each block can keep a pointer in the shared memory that redirects to the next available slot in the output chunk. When a thread in a block needs to output, the thread can acquire the current value of the pointer in the shared memory and increase it via an atomic operation. Then, the thread can output the result to the available slot. This technique can take advantage of low cost of atomic operations against shared memory locations.

Algorithm 3: Probe in GPU Hash Join

Input: relations R and S
Output: array of matching pairs globalPtr;number of matches for each block matches;
1:  pid ← blockIdx.x; //Partition id
2:  while pid < nPartitions do

```
Algorithm 3: Probe in GPU Hash Join

3:      matches ← 0;
4:      SharedBuf[VB] ← load partition pid of R;
5:      Synchronize;
6:      data[VT] ← load VT tuples from partition pid of relation S;
7:      bufPtr ← atomicAdd(globalPtr,bufSize);
8:      count ← 0;
9:      for i = 0 to VT-1 do
10:         for j = 0 to VB-1 do
11:             if Hash(data[i].key) == Hash(SharedBuf[j].key) then
12:                 bufPtr[count++] ← (data[i],ShareBuf[j]);
13:                 if count == bufSize then
14:                     bufPtr ← atomicAdd(globalPtr,bufSize);
15:                     count ← 0;
16:                 end if
17:             end if
18:         end for
19:     end for
20:     pid ← pid + NumBlocks;
21: end while
```

The hash join design can take data skew into consideration. Here "data skew" can refer to some of the partitions based on the hash value being larger than others. In extreme cases, most of the data is distributed in just a few partitions. As a result, the corresponding thread blocks in probe stage become the bottleneck of the whole procedure.

To deal with data skew, the skewed partitions can be processed in a separate kernel function that provides more working threads for the extra data. This method is simple and efficient, but needs to keep more intermediate states for scheduling. This can be improved using dynamic parallelism. The dynamic parallelism can provide dynamic creation of additional kernels within current workflow. If the size of a certain partition exceeds the predefined threshold, the block that is processing this partition can create a child kernel that exclusively works on this partition. The child kernel can run concurrently with the parent kernel and other child kernels until it finishes, and then the child can return to its parent thread. The launching parameters of the child kernels (i.e. block size and grid size) can dynamically change according to the sizes of their corresponding partitions. This technique brings more flexibility for dealing with skewed data.

The sort-merge join can be divided into two stages: (1) sorting the input relations by the attribute(s) involved in the join condition and (2) merging the two sorted relations to find matching tuples. With reference to the sort stage, discussed is a highly efficient parallel merge-sort algorithm. Previous work has limitations in that the radix sort only applies to numeric data and becomes costly as the key size grows. The bitonic sort has a unique pattern of comparison which requires power-of-two number of data points.

The merge-sort can sort any type of data and are more flexible on data size than bitonic sort. Although bitonic sort in serial code has low time complexity (O(log 2 n)), its best parallel version has a subpar O(n log 2 n) total computation. Bitonic sort is also hard to exploit locality and coalesced memory access when data is large as it accesses different locations each time. Merge-sort, on the contrary, merges two consecutive chunk of data at a time, which can utilize the register blocking, coalesced global memory access, and shared memory of the GPU.

Figure 5:
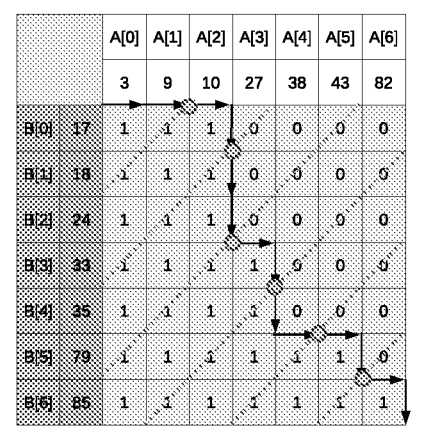

According to our experiments, this highly efficient use of memory bandwidth results in a 7 times speedup compared with the bitonic sort in existing work. In some embodiments, the bitonic sort process can be based on a parallel merge algorithm named Merge Path. An example of the sort process is shown in FIG. 5. Consider the merge of two sorted arrays A and B, wherein a merge path is the history of the merge decisions. It is more clearly illustrated by a |A|×|B| matrix, in which an element (i,j) is 1 when A|i|<B|j|, and 0 otherwise. The merge path can lie exactly on the boundary between the two regions containing only 0s and 1s, respectively. If we break the merge path into equal-sized sections, the projections of each section on A and B arrays can correspond to the elements to be merged by this section, thus each section can merge their own data independently. One aspect of this method is how to find the merge path without actually carrying out the merging process. To find the merge path, cross-diagonals can be used, which are shown as dash lines in FIG. 5.

By performing binary searches on the pairs of A|i| and B|j| along the cross-diagonals of the matrix, where i+j is equal to the length of the corresponding cross-diagonal, the intersections of the merge path and the cross-diagonals can be obtained. These intersections can provide the starting and ending points of each sections of the merge path. As the sections are equal-sized, load balancing can be naturally achieved without additional effort. Based on this highly parallel and load-balanced merge procedure, efficient merge-sort algorithm can be realized on GPUs.

```
Algorithm 4: BlockSort

Input: Input relation R;
Output: Sorted sublists;
1:      data[VT] ← load VT tuples from relation R;
2:      sort data[ ] sequentially;
3:      copy data[ ] to shared memory;
4:      for n ← 2, 4, 8, ..., BlockSize do
5:          L ← VT×n/2
6:          find the merge path of two sorted data[ ] of length L;
7:          merge the two sorted data[ ] into one list of length 2L in
                shared memory with n threads cooperatively;
8:      end for
9:      Store the sorted tuples to global memory;
```

In our sort stage, input relations can be first partitioned into small chunks of size VT, and after, each thread can load a chunk of input data into its registers as an array using static indexing and loop unrolling to achieve more efficiency, as shown in Algorithm 4. The array can be accessed using loops in a sequential way. This method ensures the whole chunk resides in registers as long as the number of registers needed does not exceed 256 per thread. Each thread can perform a sequential odd-even sort on its own chunk and store the sorted chunks into shared memory. In one example, since VT is set to 8 after some tests for optimal performance for the GTX Titan X, the overhead of using odd-even sort on data sitting in registers is acceptable.

After each thread has their own chunk sorted, all the threads in a thread block can work cooperatively to merge the chunks in shared memory using a parallel merge algorithm until they become a single sorted array. Then, all the blocks can store their outputs to global memory and cooperatively merge the arrays using the parallel merge algorithm again, until the whole relation is sorted (Algorithm 5). The arrays can be loaded into the shared memory, and each thread can execute a serial merge independently on their own partitions and store the merged list to registers which are to be output later to global memory in batch. In summary, the sort stage can rely heavily on registers (in BlockSort) and shared memory, which are of much smaller volume in early GPUs.

In the merge join stage, the two sorted relations can be treated as if they were to be merged into one list. The first partitions can include relation R divided into small equally sized chunks that fit into the shared memory, then search into the other relation S for matching chunks. Each tuple in a chunk of S can find matches using a binary search on the corresponding chunk of R.

A parallel merge algorithm can be used at this stage as well. To find matching tuples, the input relations can be partitioned using the parallel merge algorithm so that each thread can work on individual chunks of the input. After loading the corresponding chunks from the two inputs into register, each thread can loop over each elements of R and runs merge path to find the starting point (e.g. the lower bound) of matching in S. This procedure can resemble a serial merge of two sorted lists, thus the total work of all threads is linear to the number of inputs. The second step is similar to the first one, except that this step is to find the starting point of matching of R for each elements in S, which is exactly the ending point (e.g., the upper bound) of matching in S for tuples in R. By subtracting the starting position from the ending position, the number of matches for each tuple in R can be obtained. Before outputing results, a prefix scan on the array of a number of matches can give the total size for allocating output buffer. Since we know where to find the matches, a second scan is no longer needed in the output stage.

---

Algorithm 5: Merge Data from different blocks

---

Input: sorted sub-arrays of size VT×BlockSize;
Output: a single sorted list;
1:  VB ← VT× BlockSize;
2:  for n = 2, 4, 8, ..., NumBlocks do
3:      L ← VB×n/2;
4:      find the merge path of two sorted sub-arrays of length L;
5:      dataShared[VB] ← corresponding partitions of
        sub-arrays for current block;
6:      merge the tuples in dataShared[ ] into one list of length
        2L to registers;
7:      store the sorted list to global memory;
8:  end for

---

Next, processes for handling large input tables are discussed. So far an assumption has been made that both tables as well as the intermediate results of the join can be put into the GPU global memory. This sets a limit on the size of tables that can be processed. The join process can be improved when this assumption does not hold to be true. Following the ideas of disk-based joins, the input tables can be broken into chunks, and pairs of chunks (one from each table) can be processed in a GPU using the aforementioned join algorithms. Join results of each pair of chunks can be written back to host memory. A first aspect can be how to schedule the shipping/processing of different data chunks to/in the GPU. Accordingly, a thorough study can consider the relative table sizes and the number of GPU devices. The following scenarios can be focused on: when there is only one GPU, table R can be completely stored in the global memory while table S is of an arbitrarily (large) size. Such a scenario represents a typical business database design such as the one found in TPC-H. Furthermore, solutions developed for such will build the foundation for more complex scenarios. Given that, R can be loaded entirely into GPU first, R can be joined with each and every chunk of S, and the results can be shipped back to host memory.

Figure 6:
FIG. 6 illustrates a diagram of a portion of a joining process according to various example embodiments.
Figure 6:
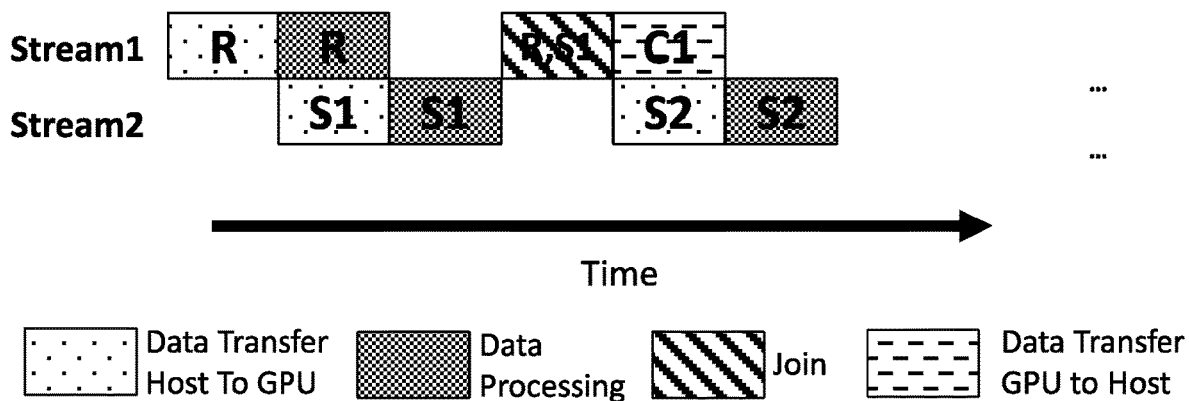

Another aspect can be to hide the data shipping latency with join computation on the device. In particular, the CUDA Stream mechanism can be utilized to allow concurrent data transfer and kernel execution between neighboring rounds of chunked joins, as shown in FIG. 6. Specifically, each chunked join can involve a kernel launch, and the series of kernel launches can be encapsulated into CUDA streams. After table R is transmitted to GPU memory, the kernel for processing (i.e., sorting or building hash) R and the transfer of S1 can be issued simultaneously. When the join results C1 are being written back to the host, the shipping of S2 can happen at the same time. In this way, the work flow can be pipelined and the overlapping of kernel execution and data transfer can help reduce the total running time.

The scenario of processing joins in multiple GPU devices can also be improved. This scenario can involve creating new data transmission scheduling among the different GPU cards as well as between the card and host. Note that the two types of transmission can be done in different physical PCI-E channels, and therefore we can handle cases in which one table can only be placed in multiple GPUs without much performance penalty.

TABLE I

SPECIFICATIONS OF HARDWARE MENTIONED IN THIS PAPER. INFORMATION IS MAINLY EXTRACTED FROM THE INTEL AND NVIDIA CORPORATE WEBSITES, WITH OTHER INFORMATION OBTAINED FROM WWW.TECHPOWERUP.COM AND WWW.CPU-WORLD.COM

| | Device | | | |
|---|---|---|---|---|
| | CPU | | GPU | |
| | Xeon E5-2630v3 | Xeon E5-2670 | Maxwell Titan X | Kepler Titan |
| Clock Rate | 2.40 GHz | 2.60 GHz | 1.00 GHz | 0.84 GHz |
| Core counts | 8 | 8 | 24 × 128 | 14 × 192 |
| L1 Cache | 256 KB | 256 KB | 96 KB × 24 | 64 KB × 14 |
| L2 Cache | 2 MB | 2 MB | 3 MB | 1.5 MB |
| L3 Cache | 20 MB | 20 MB | — | — |

TABLE I-continued

SPECIFICATIONS OF HARDWARE MENTIONED IN THIS PAPER.
INFORMATION IS MAINLY EXTRACTED FROM THE INTEL AND
NVIDIA CORPORATE WEBSITES, WITH OTHER INFORMATION OBTAINED
FROM WWW.TECHPOWERUP.COM AND WWW.CPU-WORLD.COM

| | Device | | | |
|---|---|---|---|---|
| | CPU | | GPU | |
| | Xeon E5-2630v3 | Xeon E5-2670 | Maxwell Titan X | Kepler Titan |
| Memory * | 128 GB DDR4 | 64 GB DDR3 | 12 GB GDDR5 | 6 GB GDDR5 |
| Memory Bandwidth * | 59 GB/s | 51.2 GB/s | 337 GB/s | 288 GB/s |
| Max GFLOPS | 153.6 | 166.4 | 6144 | 4494 |

* For CPUs, here we refer to the host memory of the computer. For GPUs, we mean the global memory.

The performance of our GPU-based join algorithms can be evaluated by comparing them with existing GPU and latest CPU join code. In addition, the effects of different factors on the performance can be shown. Although various hardware and software configurations can be utilized, in one experimental setup, two Intel CPUs and two NVidia GPUs were selected for experiments. The specifications of the hardware for these experiments is listed in Table I. The E5-2650v3 and Titan X represent a recent generation of their kind while the E5-2670 and Titan represent high-end hardware that are 3-4 years old. Plus, the corresponding CPU and GPU hardware have very similar price tags. The E5-2630v3 and E5-2670 are installed on two separate servers running Red Hat Linux under kernel version 2.6.32 and GCC version 4.4.7. The GPUs are connected via PCIE 3.0 16X interface to the same server that hosts the E5-2630v3. The GPU code is compiled under NVCC 7.5. An NVidia tool named NVProfiler was used to study the runtime characteristics of the GPU code.

To maximize the performance of the CPUs, 16 threads were run for the CPU code, which can be the optimal number obtained from a series of tests in some embodiments. Unless specified otherwise, the two input relations can be set to be of the same size. Each tuple in the tables includes two parts: a 32-bit integer unique key and a 32-bit integer payload that serves as the ID of the tuple. The keys are first generated in order and then shuffled randomly. The keys are uniformly distributed between 1 and table size N. An equi-join was performed on the key. The selectivity of the join condition is set to render one output item per tuple on average.

Figure 7:
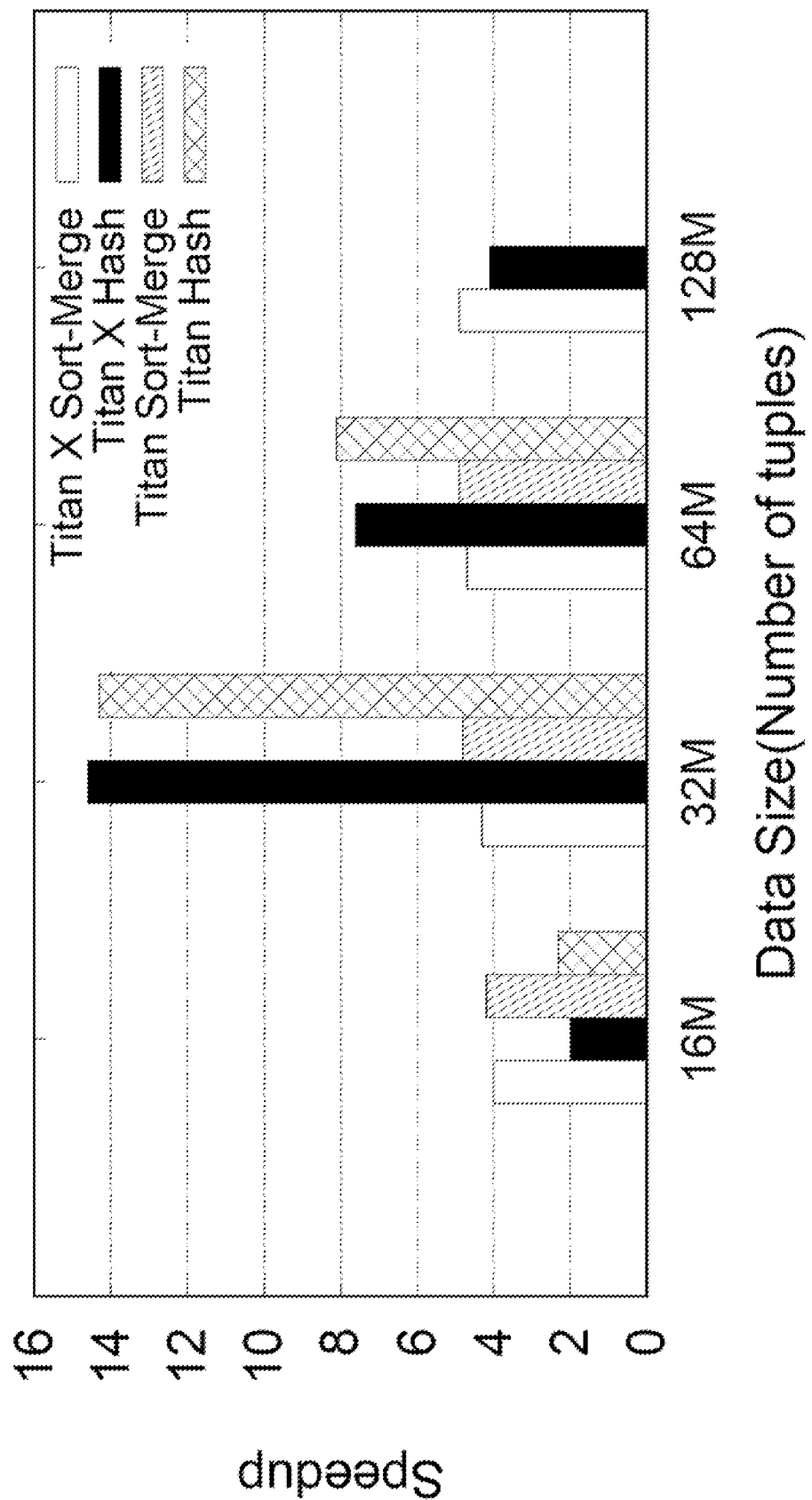
FIG. 7 illustrates a graph of an example of speed improvements for a joining process according to various example embodiments.

According to FIG. 7, our GPU join processes significantly outperform existing joins. Specifically, the sort-merge join process achieves 4.0-4.9× speedup, with speedup increasing slightly higher as the data size increases. On the other hand, a 2.0-14.6× speedup is observed for the hash join process. In example experiments, the same results can be seen in both the Maxwell Titan X and Kepler Titan cards. However, due to the small global memory of Titan (8 GB), the join code cannot run under a 128M table size. The large variation of the speedup in hash join can be caused by the partitioning strategy of the old code. In particular, when table size reaches 32 million tuples, the partitioning process changes from two-pass to three-pass in order to keep each partition small. This can result in a sudden increase of running time. In contrast to that, the hash join process can generate more partitions per pass, thus ensuring two passes is enough for a large range of data sizes. As a result, the running time of the hash join process grows proportionally to the input size.

To get insights on the big performance gap between existing joins and the join processes discussed herein, the GPU resource utilization achieved by major kernels can be studied in both processes. In one example, such data can be collected via NVProfiler, which is presented in Tables II and III. It can be noted that the block sizes shown represent those that deliver the best kernel performance. For sort-merge join (Table II), the existing code used a bitonic sorting network that directly operates on global memory. Only when sorting a partition of the data (kernel PartBitonic), the shared memory is used, but only 50% bandwidth (1586 GB/s) is utilized. When combining all the partitions (kernel Bitonic), the accesses to the global memory are entirely random and non-coalesced.

Although these kernels have relatively high multiprocessor occupancy (e.g., the number of threads that can run at the same time on a multiprocessor), they are bound by the utilization of shared memory and bandwidth of global memory, respectively. On the contrary, our sort-merge join process can make every step local to the threads. In the blocksort kernel, each thread sorts its own items in registers in a sequential manner with zero latency, then the whole block of threads combine their tiles together in the shared memory. Even though the occupancy of this kernel is only 62%, the nearly 100% (3.3 TB/s) bandwidth utilization on the shared memory ensures the overall performance. Furthermore, all the merging operations can also be completed in shared memory. Finally, all the data can be in order and can be output to global memory efficiently with coalesced access.

For hash join (Table III), the main problem with the existing methods is the unbalanced use of GPU resources. In particular, due to the lack of atomic operations in older GPUs, each thread keeps its own copy of an intermediate output (i.e., histogram of radix partition) in the shared memory. As a result, in the histogram and reorder kernels, only eight threads can be put into each block. That is even smaller than the basic scheduling unit of the GPU, which is 32 threads (a warp) at a time. Because of that, only 16% occupancy is achieved by these kernels, meaning that the multiprocessors are extremely underutilized. In the presented hash join kernels, both the histogram kernel and reorder kernel achieve more than 87% occupancy. With the help of atomic operation, one copy of shared histogram can be kept for a block, thus only 4 KB of shared memory is used even for a block size of 256. Writing to global memory can also be improved because of the shared histogram. All of the threads in a block can write to a limited space of the output. This increases locality and thus the utilization of L2 cache increases. In both sort-merge and hash joins processes, the use of registers per block has increased significantly to take advantage of the large register file in the latest GPU.

performance over the Kepler Titan for sort-merge join and hash join, respectively. This can be interpreted as the result of the computing capacity of new generations of GPUs that increased significantly over the past few years (Table I). On the CPU side, the newer Haswell E5-2630v3 is 26% and 2% slower than the older E5-2670 in sort-merge join and hash join, respectively. This shows that the architectural update

TABLE II

RESOURCE UTILIZATION OF MAJOR KERNELS IN THE NEW AND OLD GPU SORT-MERGE JOIN CODE

| | New Algorithms | | Existing Algorithms | |
|---|---|---|---|---|
| Kernal | BlockSort | Merge | partBitonic | Bitonic |
| Block Size | 256 | 256 | 512 | 512 |
| Registers/Thread | 41 | 31 | 16 | 10 |
| Shared Memory/Block | 9 KB | 9 KB | 4 KB | 0 KB |
| Occupancy Achieved | 62.1% | 98.8% | 93.2% | 84.8% |
| Shared Memory Bandwidth Use | 3308.2 GB/s | 1098.6 GB/s | 1585.9 GB/s | 0 GB/s |
| L2 Cache Bandwidth Use | 84.6 GB/s | 295.3 GB/s | 110.1.0 GB/s | 262.60 B/s |
| Global Memory Bandwidth Use | 84.5 GB/s | 253.3 GB/s | 109.5 GB/s | 262.90 B/s |

TABLE III

RESOURCE UTILIZATION OF MAJOR KERNELS IN THE NEW AND OLD GPU HASH JOIN CODE

| | New Algorithms | | | Existing Algorithms | | |
|---|---|---|---|---|---|---|
| Kernel | Histogram | Reorder | Probe | Histogram | Reorder | Probe |
| Block Size | 256 | 256 | 256 | 8 | 8 | 128 |
| Registers/Thread | 13 | 20 | 22 | 14 | 16 | 18 |
| Shared Memory/Block | 4 KB | 4 KB | 4 KB | 8 KB | 8 KB | 4 KB |
| Occupancy Achieved | 87.6% | 89.1% | 91.0% | 16.6% | 16.4% | 83.1% |
| Shared Memory Bandwidth Use | 201.5 GB/s | 19.5 GB/s | 775.3 GB/s | 275.9 GB/s | 85.6 GB/s | 637.3 GB/s |
| L2 Cache Bandwidth Use | 357.3 GB/s | 171.3 GB/s | 28.3 GB/s | 36.4 GB/s | 59.8 GB/s | 28.6 GB/s |
| Global Memory Bandwidth Use | 103.2 GB/s | 98.1 GB/s | 8.5 GB/s | 36.4 GB/s | 58.9 GB/s | 23.3 GB/s |

When comparing hash joins and sort-merge join for GPUs, one key is the utilization of the memory system. The sorting stage in the sort-merge join can rely heavily on the fast shared memory and register file to reorganize the inputs. However, the radix partition of the hash join can have more random access, thus is hard to be localized into shared memory. At best, the memory access can be cached by L2, but its bandwidth is one magnitude lower than that of shared memory. Therefore, when using the disclosed processes, the sort-merge join can be up to 26% faster than the hash join.

Figure 8:
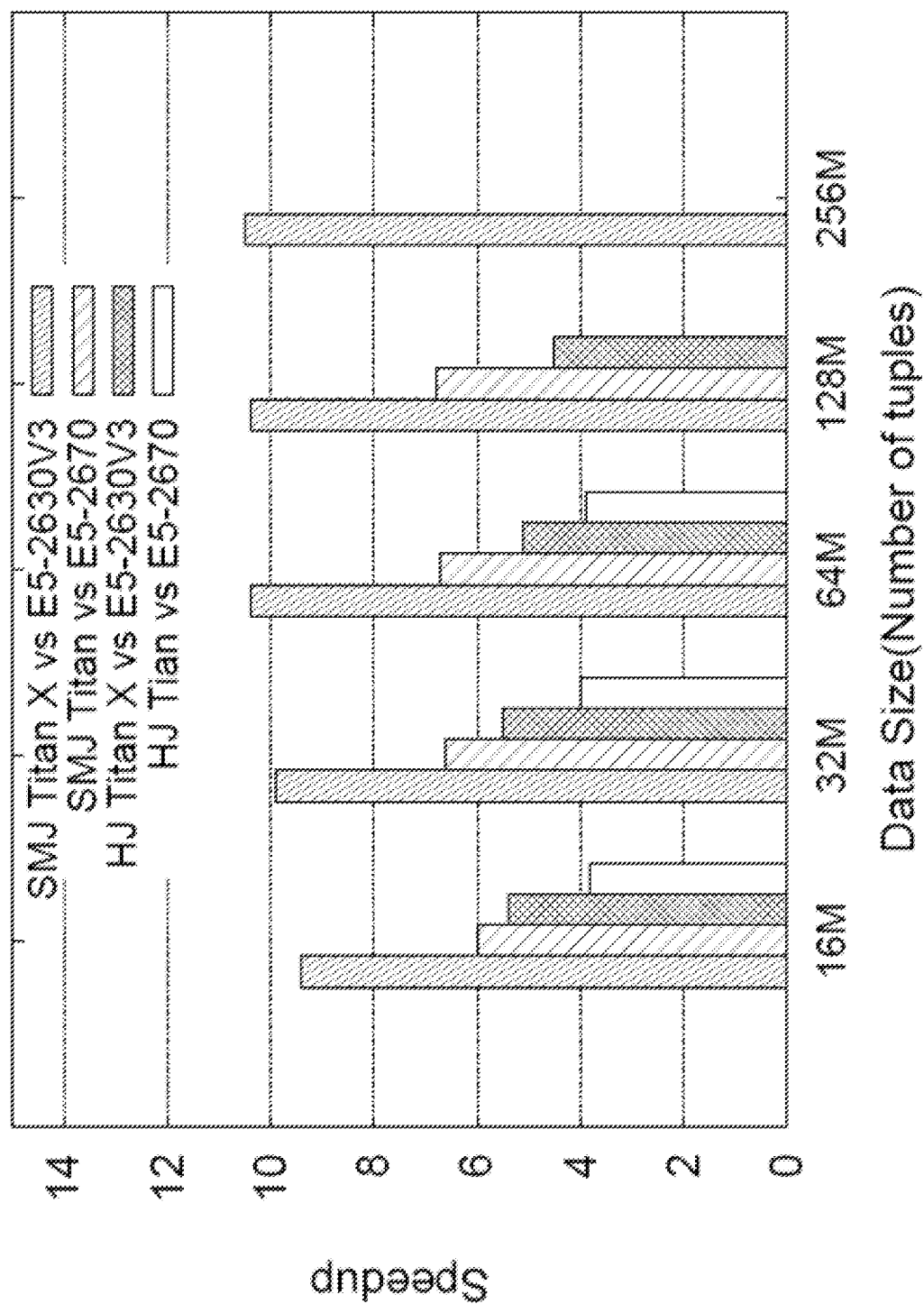
FIG. 8 illustrates a graph of an example of speed improvements for a joining process according to various example embodiments.

FIG. 8 shows the relative performance of our GPU code to the latest CPU-based joins. One note is that the older E5-2670 outperforms the newer E5-2630v3 in all cases, but the newer Titan X GPU performs better. Therefore, the relative performance between Titan X and E5-2630v3 shows the maximal GPU-to-CPU speedup while Titan to E5-2670 shows the minimal GPU-to-CPU speedup in our tests. Clearly, the GPUs outperformed CPUs in both sort-merge join and hash join by a large margin. In sort-merge join, the Maxwell Titan X achieved more than 10× speedup over the Haswell E5-2630V3, while the Kepler Titan had up to 6.8× speedup over the Sandy-Bridge E5-2670. In hash join, the advantage of GPUs shrinks but is still considerable. The hash join process running on Titan X achieved a 5.5× speedup over the E5-2630V3, while the Titan obtained a 4.0× speedup over the E5-2670.

In terms of performance improvement between two generations of hardware, the GPUs see more benefit. The Maxwell Titan X improved by 22% and 35% in overall on CPUs does not bring any performance advantage in join processing. Although the E5-2630v3 works on a new generation of memory (e.g., DDR4), the higher clock rate of E5-2670 cores actually makes better use of the memory bandwidth.

Figure 9:
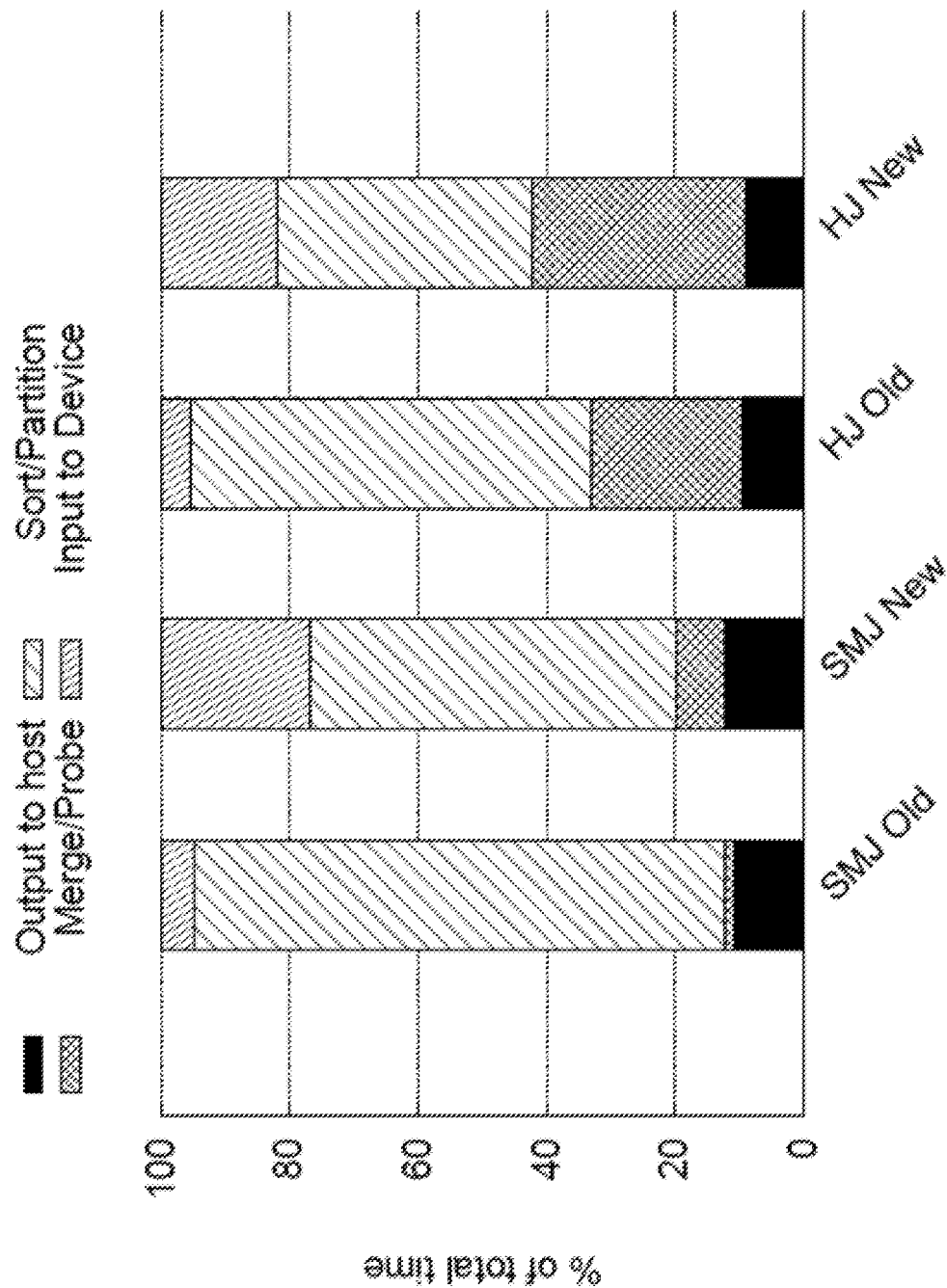
FIG. 9 illustrates a graph of an example of processor utilization by function for a joining process according to various example embodiments.

The execution time breakdown of the GPU code for the join processes and that provided by existing join algorithms is shown in FIG. 9. The transmission of input/output data to/from GPU is an extra cost for the GPU code, and it counts for 35% and 27% of the total time in the sort-merge join and hash join processes, respectively. Since the join kernels of sort merge are faster than hash join, the data transfer time takes up a higher percentage in hash join—almost ⅓—of the total execution time.

When comparing the disclosed join processes with existing joins, it can be seen that the join processing time in the disclosed join processes contributes less to the total running time while the data transfer time contributes more. In sort-merge join, the percentage of sorting stage time dropped from 82.7% to 57.1%, which corresponds to a 7× performance speedup. The merge-join is, however, not a time consuming stage, taking up less than 8% of execution time. The merge-join stage is somewhat slower because the existing join uses a different mechanism that builds tree indexes for one of the input relations after sorting. But the merge stage gained some benefit from the indexes. But the disclosed sort-merge join is still much faster in terms of GPU processing time. In hash join, both partition and probe stages are much faster than existing code, achieving 6.2× and 3.8× speedup respectively. The results indicate that the newly designed kernels are more efficient than those in the existing code by using optimizations that take advantage of the new GPU architectural features. If we do not consider the time for data transfer between host and GPU, both sort-merge and hash in GPU will get a much higher speedup. For sort-merge the speedup would become 15.5-17.5× while for hash join it is 6.3-8.3×. Obviously, a GPU is way more efficient than a CPU in processing the join itself but gets a big hit in data communication via the PCI-E bus.

Figure 10:
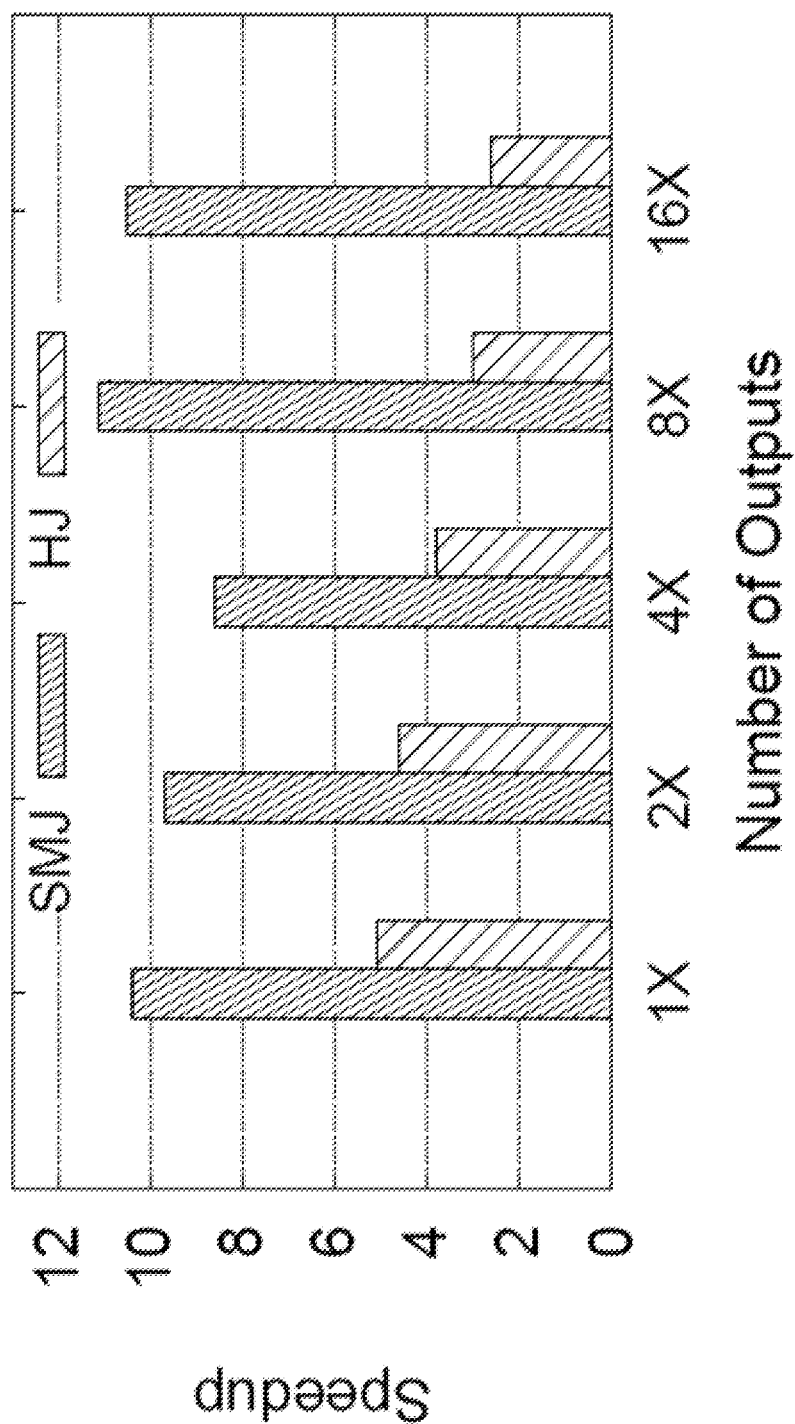
FIG. 10 illustrates a graph of an example of speed improvements for a joining process according to various example embodiments.

With reference to FIG. 10, shown are the effects of join selectivity, including the impact of varying selectivity, such as, for example, the total number of output tuples according to various embodiments of the present disclosure. The GPU sort-merge join can include a speedup of 10× over the CPU except at 4× of outputs where it drops to 8.5×. On the other hand, the GPU hash join can result in reduced performance from the increasing outputs with a decreasing speedup over the CPU from 5.1× to 2.6×. When more tuples are generated as a result of the join, the GPU program can bear a higher overhead as more data will be written back to host via PCI-E channels. This can explain why the hash join performance degrades. However, the impact of selectivity on sort join performance does not seem obvious. Scrutinizing the behavior of the sort join process determined that the actual running time of the sort merge code does increase as more output tuples are returned. On the other hand, due to a special design of a data structure for holding output tuples, the CPU-based sort-merge join code suffers from more serious performance cuts when the output size increases. This overshadows the performance loss observed in GPU code; therefore, the GPU-to-CPU speedup stays on the same level. As a general trend, the lower selectivity could hurt the performance of GPU programs. But the strategy of overlapping data transmission and join processing can offset these effects.

Figure 11A:
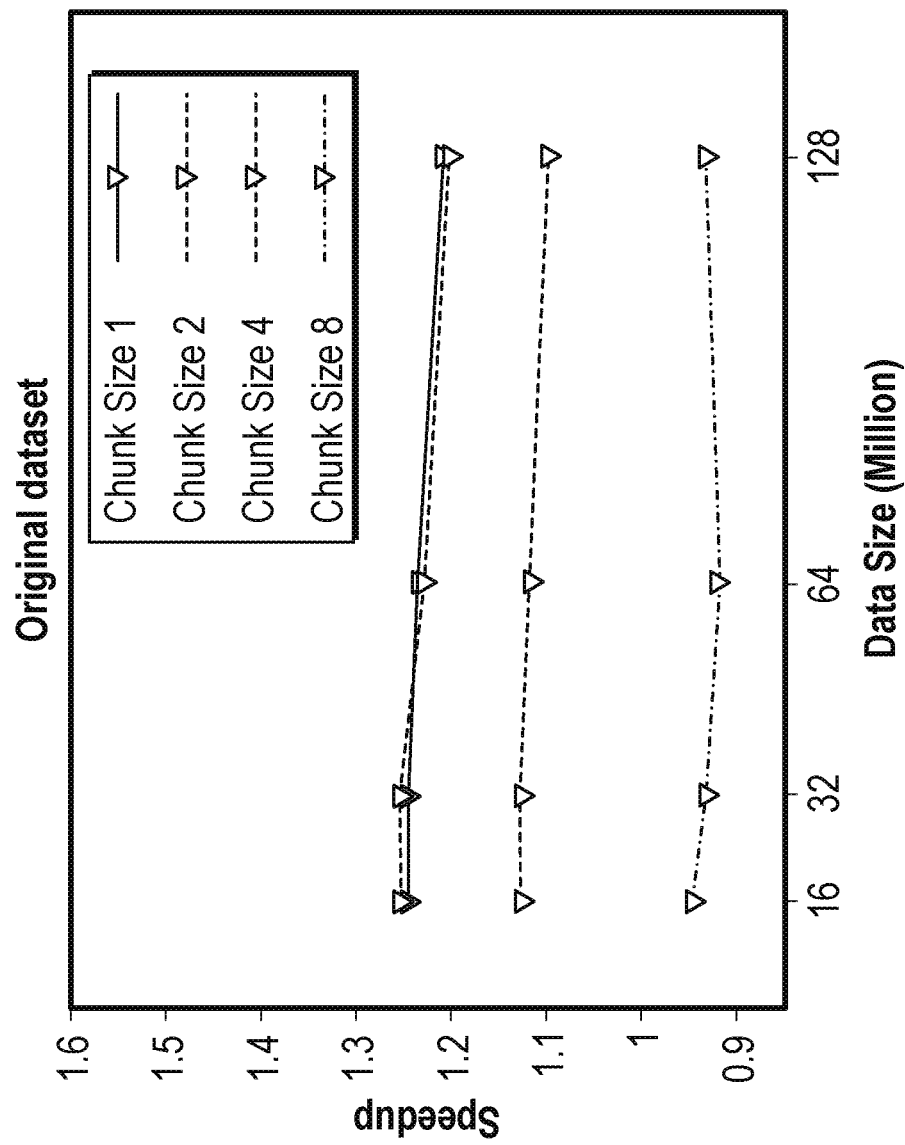
FIG. 11A illustrates a graph of an example of speed improvements for a joining process according to various example embodiments.

By using the direct output buffer, the hash join process can see a significant benefit. As an example, FIG. 11A shows the results of the hash join process comparing with the same process without using a direct output buffer. With a page size of one, improvement starts with 25% under 16M data size, and as the input data becomes larger, the improvement gradually drops down to 20%. Such a drop can be attributed to the increase of atomic operations to acquire the pointer to the buffer in global memory. When the input size increases, the number of output tuples also grows proportionally. Each thread has to request more chunks to store the output, thus increasing the number of atomic operations as an overhead to the process. This technique was tested with the sort-merge join as well, but it does not improve the performance because the join stage in sort-merge join is different from that in hash join. A linear search is used for the sorted data to determine the range of the output without scanning the whole table, so it saves more time compared with the double-probing approach in the hash join.

Figure 11B:
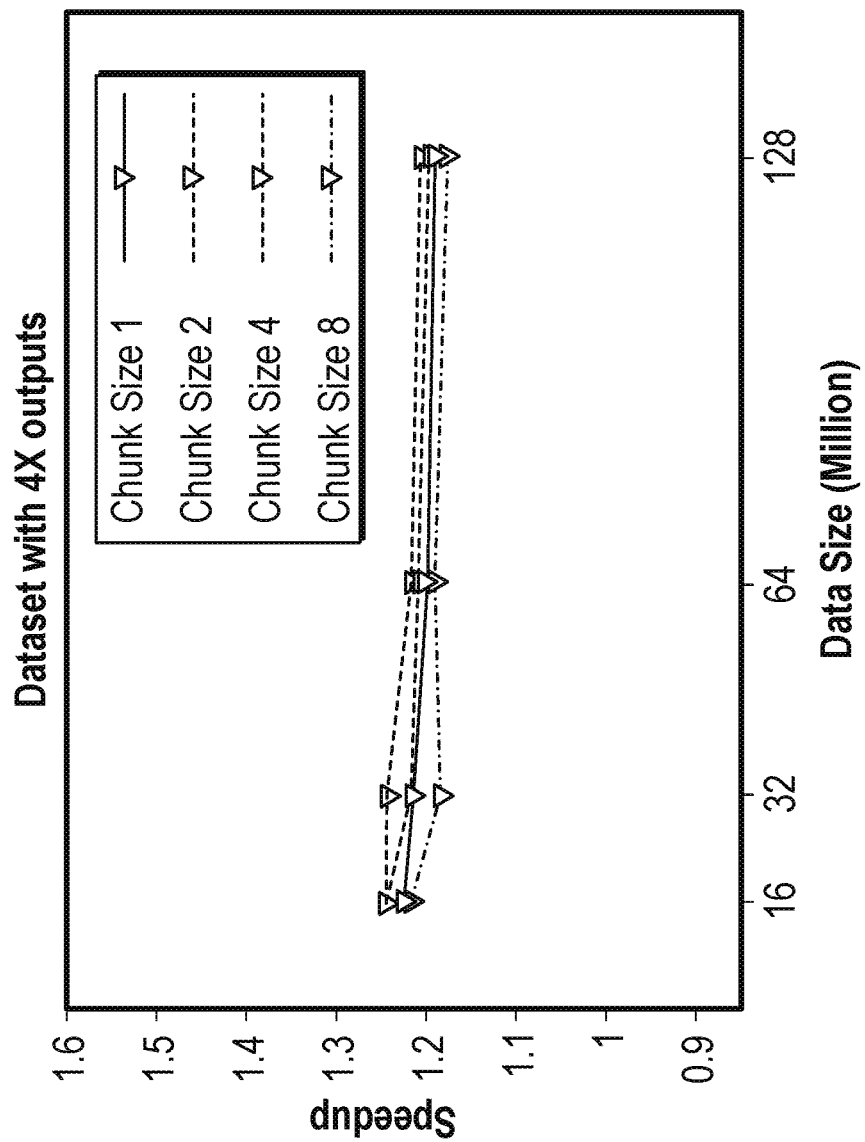
FIG. 11B illustrates a graph of an example of speed improvements for a joining process according to various example embodiments.

Tests were also used to determine an optimal page size for the output buffer. Small page sizes of one or two can help achieve the best performance with the datasets used. This can be attributed to the fact the larger page size also requires larger overall buffer size since there may be empty holes in some of the pages. The time spent on transferring the output buffer back to main memory increases as the result of increasing buffer size. This increase can offset the benefit of reducing atomic operations. However, a larger chunk size may help when the number of outputs per thread increases. Therefore a test was ran on a dataset of the same size as the original dataset, but four times the number of outputs were generated. The results are shown in FIG. 11B. As shown, the four different chunk sizes can have similar performance at 64M and 128M, while the chunk size four stands out at smaller data sizes. Chunk size of eight is the worst case, indicating that there are still empty holes.

Figure 12:
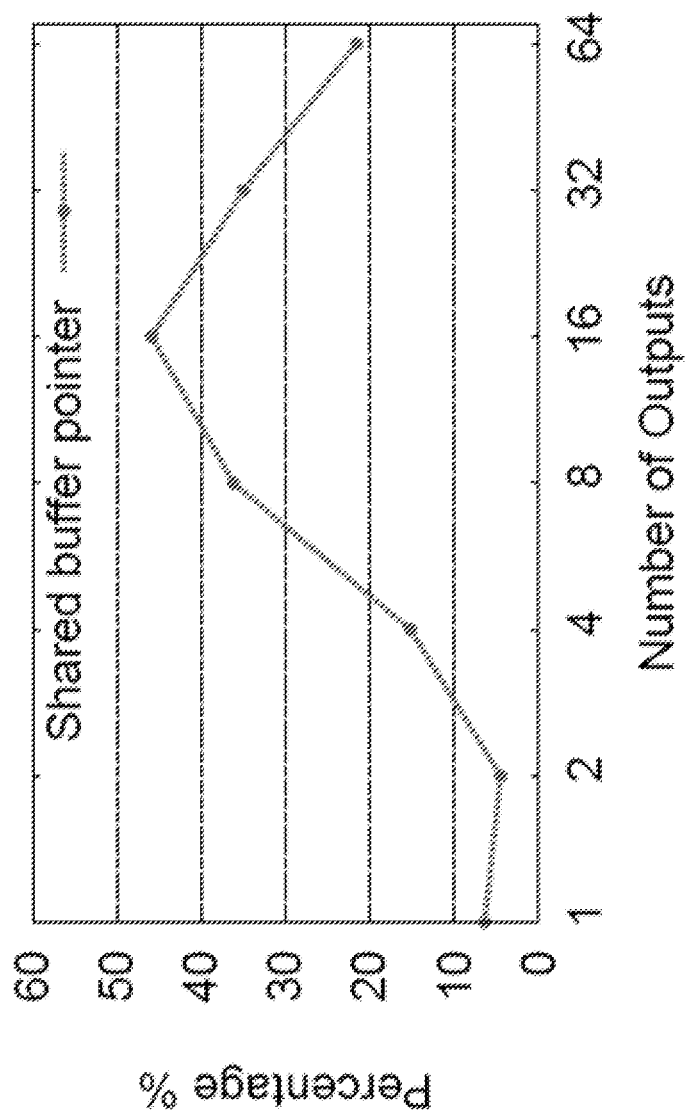
FIG. 12 illustrates a graph of an example of speed improvements for a joining process according to various example embodiments.

Tests were also performed as to how the buffer chunk size affects the performance when the total number of threads decreases and work per thread increases. When outputs per thread increases, a larger page size can help reduce the number of requests to the global pointer. However, the results of the test indicated that larger chunk size only brings marginal improvement. In some embodiments, the atomic operation in the GPU can be implemented very efficiently and the pointer can be cached in L2, thus the atomic operation may not be so sensitive to contentions. Another way to reduce contention is to distribute the acquisitions of the shared pointer to thread block level. The output buffer can be divided into small chunks so that each block can take one chunk and generate an output independently. The threads in the same block can share a pointer in the shared memory that points to the next available slot in their own chunk. A thread can acquire the pointer and increase the pointer using atomic operations, then output to the available position. Larger selectivity benefits from this method are shown in FIG. 12. According to one embodiment, a maximum improvement of 45.9% was achieved when the number of output was 16×. However, as the number of outputs continues to increase, the number of atomic operations on shared pointers can also come to a point where it begins to limit performance improvement.

Figure 13:
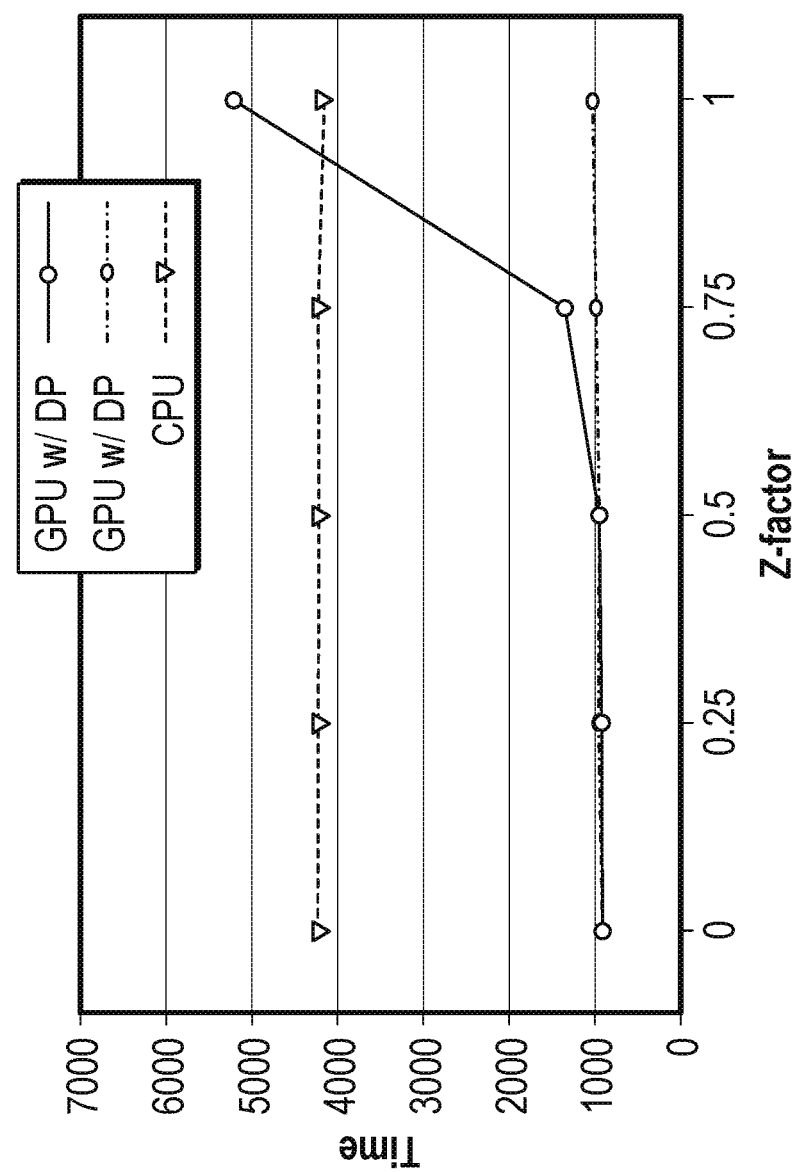
FIG. 13 illustrates a graph of an example of slowdown when dynamic parallelism is disabled for a joining process according to various example embodiments.

The performance of both the CPU and new GPU hash joins can be analyzed when the data has a skewed distribution (in the hashed domain). Specifically, data was generated that follows the Zipf distribution with different z factors. An embodiment of the hash join process was executed without the dynamic parallelism (DP) code, and it suffered from imbalance among the partitions under skewed data, as shown in FIG. 13. As the z-factor increased, data was more skewed and there was more performance degradation. Particularly, when the z-factor went beyond 0.5, only a few blocks were kept busy processing the largest partitions while most of other blocks finished early. In the extreme case of z=1, the skewing caused a 4× slowdown as compared to the case of balanced data (i.e., z=0).

After applying DP to the code, threads can determine whether the current partition is too large for the thread blocks to process, thus launching additional threads in a child kernel to work only on this partition. The total execution time does not change significantly as the z-factor increases. However, there is a slight penalty when the z-factor reaches 0.75. This can be attributed to the overhead of launching new kernels. The CPU code is not affected much by data skew. In fact, the CPU code tackles this problem using a similar idea, but in a slightly different way. It decomposes unexpectedly large partitions into smaller chunks. The small chunks are processed by using all the thread.

Figure 14:
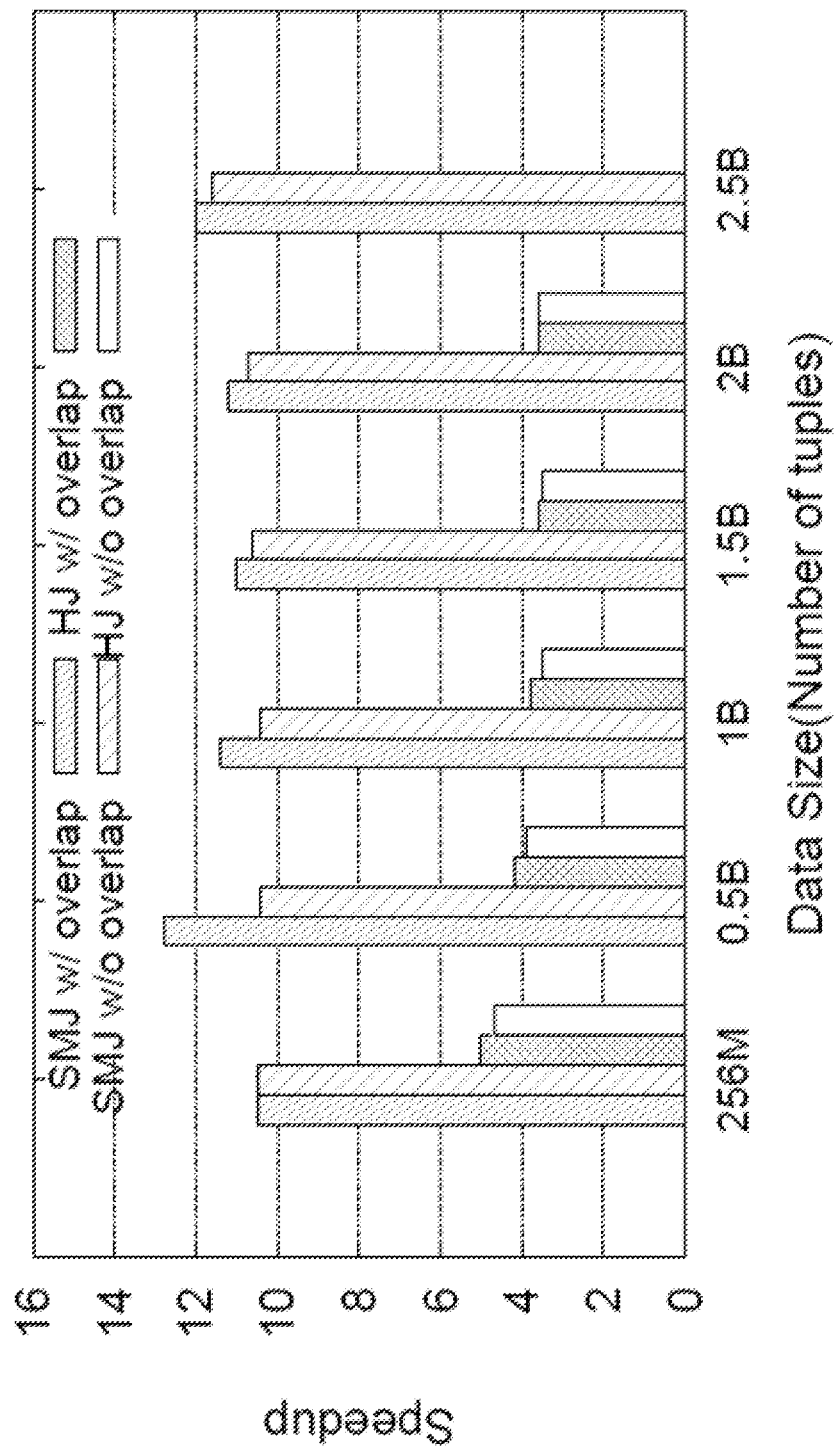
FIG. 14 illustrates a graph of an example of speed improvements for a joining process according to various example embodiments.

A test was performed using the GPU join process to handle large data that exceeds the capacity of GPU global memory. In such experiments, the size of table R was kept fixed (128M tuples for hash join and 256M tuples for sort-merge join), and the size of table S varied from 256M to 2.56 billion tuples. In order to process such a large table, the data was sliced into chunks with all of the chunks taking turns to join with table R. In one embodiment, since the memory usage of hash join can be higher than the sort-merge join, the hash join can only handle a 128M-tuple chunk at a time, while the sort-merge join takes a 256M-tuple chunk in each iteration. Therefore, for a given data size, the hash join has to go through more loops which impacts the overall performance. FIG. 14 shows the speedup of the Titan X over the E5-2630v3.

The sort-merge join on GPUs is more capable of processing large data, resulting in speedup between 11× to 13×. The sort-merge join speedup fluctuates but does not decrease as the size of table S increases. Since the GPU sort-merge join algorithm needs fewer loops than the hash join, the running time can grow in a nearly linear manner. This is the reason why the GPU sort-merge join process maintains the high speedup. The hash join on GPU achieves a 5.1× speedup under 256M tuples. However, the hash join can decrease as the table size increases and converges to around 3.5×. The kernel execution and data transfer overlapping (via multiple CUDA streams) is effective for both processes. On average, there is a performance gain of 8% and 6% for sort-merge join and hash join, respectively. Based on profiles of code, it can be determined that various kernel synchronization activities decrease the level of concurrency at runtime. Note that the CPU hash join code actually sets a limit on table size such that it cannot handle the case of 2.5B records in table S.

Figure 15:
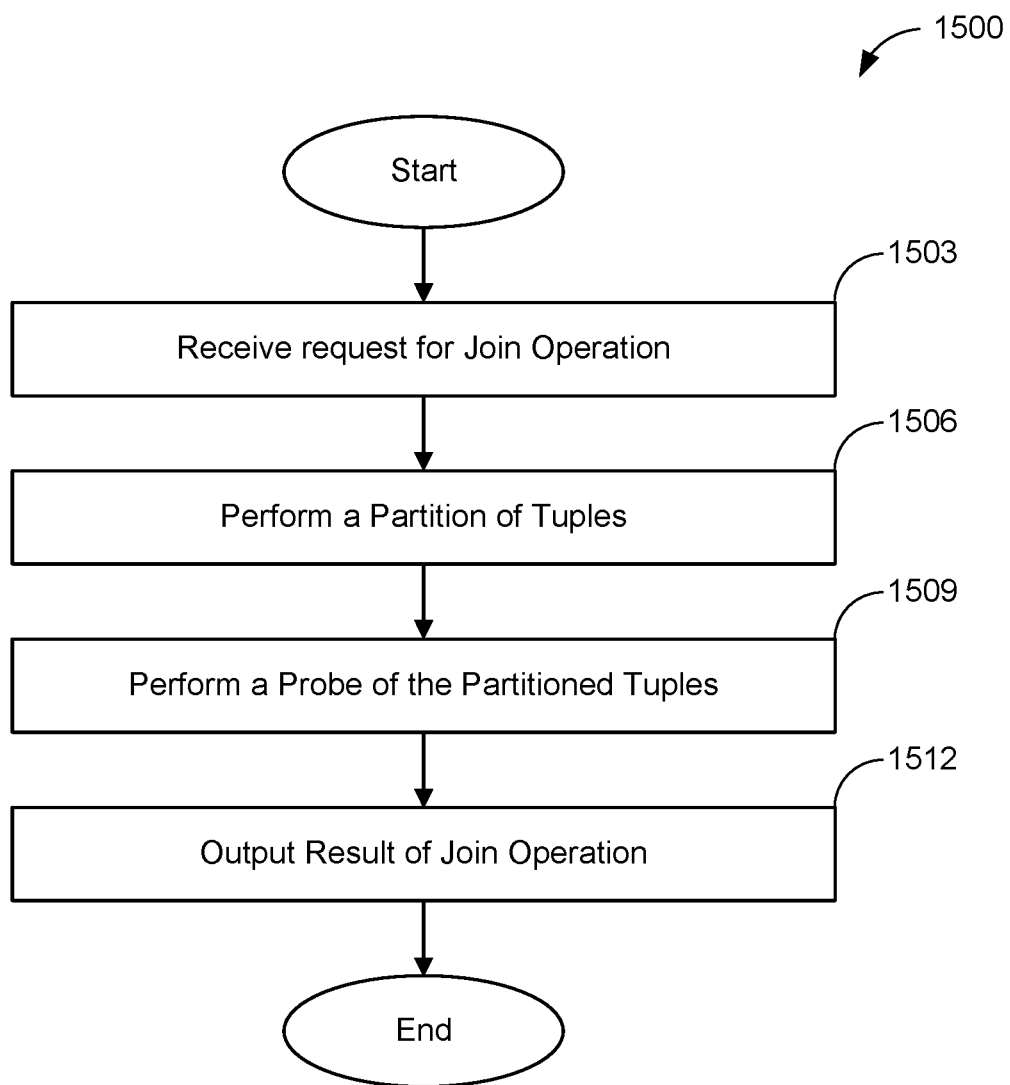
FIG. 15 illustrates an example flowchart of certain functionality implemented by portions of a graphics processor unit in the computing environment of FIG. 1 according to various embodiments of the present disclosure.
Figure 16:
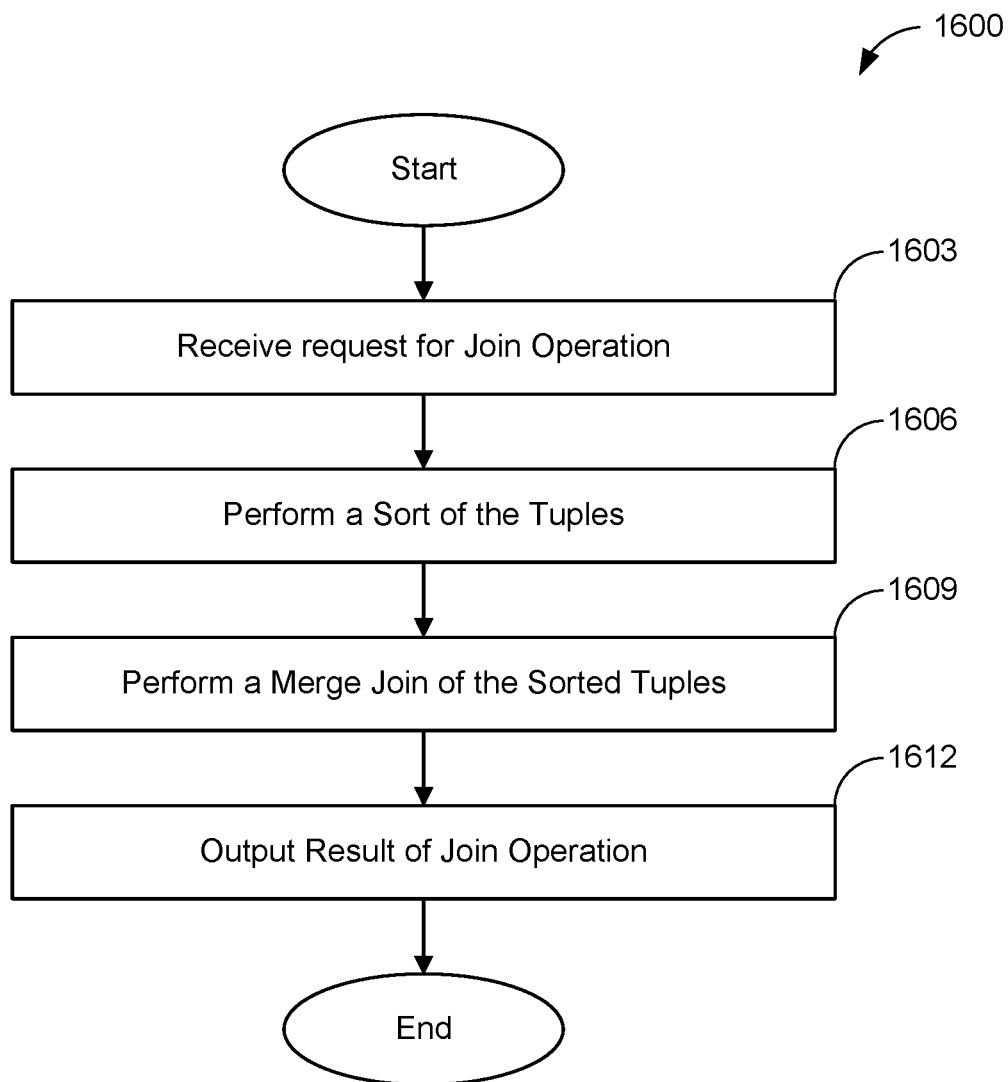
FIG. 16 illustrates an example flowchart of certain functionality implemented by portions of a graphics processor unit in the computing environment of FIG. 1 according to various embodiments of the present disclosure.

Before turning to the process flow diagrams of FIGS. 15 and 16, it is noted that embodiments described herein may be practiced using an alternative order of the steps illustrated in FIGS. 15 and 16. That is, the process flows illustrated in FIGS. 15 and 16 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. The steps of FIGS. 15 and 16 can be considered as steps of a method performed in a GPU either alone or in coordination with a CPU.

With respect to FIG. 15, shown is a hash join process 1500 according to various embodiments of the present disclosure. At box 1503, the process 1500 includes receiving a request to perform a join operation. The request can originate from a CPU, such as, for example, over a PCI Express connection. In one embodiment, the join operation is performed automatically based on program code in the GPU.

At box 1506, the process 1500 can perform a partition of tuples. The tuples can be sequences from tables to be joined. For example, the GPU can launch various threads to partition the tuples. The GPU can initialize a histogram in a memory location shared by a threads. The threads can each process subsets of the tuples to determine hash values for the histogram. The threads can reorder the tuples using the hash values from the histogram. In some embodiments, the GPU can execute the code to perform the functionality in Algorithms 1 and 2 above to perform the partition.

At box 1509, the process 1500 can include probing the partitioned tuples. The GPU can perform a single probe using the partitions. The threads can output arrays of matching pairs and a number of matches for each block. The partitions can be loaded into memory shared by a block of threads. A partition that has the same hash value can be loaded into registers by the block of threads. In one embodiment, the GPU can execute the code to perform the functionality in Algorithm 3 above to perform the probe.

At box 1512, the process 1500 includes outputting the results of the join operation. The results can be output to a buffer. Buffers can be dynamically allocated for outputs to remove a need for a second probe. The threads can output the results in parallel to the probe. The threads can store the outputs in a buffer pool in global memory. The GPU can transmit the results of the join to the CPU.

With respect to FIG. 16, shown is a sort merge join process 1600 according to various embodiments of the present disclosure. At box 1603, the process 1600 includes receiving a request to perform a join operation. The request can originate from a CPU, such as, for example, over a PCI Express connection. In one embodiment, the join operation is performed automatically based on program code in the GPU.

In box 1606, the process 1600 includes performing a sort of tuples from tables to be joined. For example, the GPU can launch various threads to sort the tuples. The GPU can partition the data into subsets of tuples for processing by each thread. The threads can each sort a respective subsets of tuples. In some embodiments, the GPU can execute the code to perform the functionality in Algorithm 4 above to perform the sort.

In box 1609, the process 1600 includes performing a merge join of the sorted tuples. As an example, multiple sorted sub-arrays can be sorted in parallel by different threads to generate a sorted array. The threads can each iteratively find a merge path for two sorted sub-arrays using a parallel merge algorithm. The two sorted sub-arrays can be merge into a list. In some embodiments, the GPU can execute the code to perform the functionality in Algorithm 5 above to perform the merge.

In box 1612, the process 1600 includes outputting the results of the join operation. The results can be output to a buffer. The GPU can perform a prefix scan prior to outputting the results. A second scan is no longer needed because of the location of the matches is known.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Clause 1. A system comprising: a central processing unit; and a graphics processing unit communicably coupled to the central processing unit, the graphics processing unit configured to at least: receive input data comprising a plurality of sequences; initialize a histogram in a memory location shared by a plurality of threads; build the histogram of hash values for the plurality of sequences; reorder the plurality of sequences based at least in part on the histogram; perform a single probe using a respective partition in each of the plurality of threads; store a respective output corresponding to the single probe from each of the plurality of threads into a buffer pool in global memory; and transmit a result of a join operation to the central processing unit based at least in part on the respective output corresponding to the single probe from each of the plurality of threads.

Clause 2. The system of clause 1, wherein the graphics processing unit is further configured to: determine that a size of one of the respective partitions exceeds a threshold; and in response to the size exceeding the threshold, create at least one additional kernel to process at least a portion of the one of the respective partitions.

Clause 3. The system of clause 1 or 2, wherein only one instance of the histogram is stored for each thread block, the plurality of threads corresponding to the thread block.

Clause 4. The system of any of clauses 1-3, wherein the graphics processing unit is further configured to build the histogram by: assigning a respective set of the plurality of the sequences to each of the plurality of threads, each of the respective sets comprising at least two sequences; and in each of the plurality of threads: generating hashes for the respective set of the plurality of the sequences; and atomically adding the hashes to the histogram in the memory location.

Clause 5. The system of any of clauses 1-4, wherein the graphics processing unit is further configured to: allocate the buffer pool in the global memory; divide the buffer pool into a plurality of pages; and assign a respective page of the plurality of pages to each of the plurality of threads.

Clause 6. The system of clause 5, wherein the graphics processing unit is further configured to: determine that the respective page for one of the plurality of threads is full; and assign another page of the plurality of pages to the one of the plurality of threads in response to determining the respective page is full.

Clause 7. A method of performing a data join at least in part in a graphics processing unit comprising: receiving input data comprising a plurality of sequences; initializing a histogram in a memory location shared by a plurality of threads; building a histogram of hash values for the plurality of sequences; reordering the plurality of sequences based at least in part on the histogram; performing a single probe using a respective partition in each of the plurality of threads; storing a respective output corresponding to the single probe from each of the plurality of threads into a buffer pool in global memory; and outputting a result of a join operation based at least in part on the respective output corresponding to the probe from each of the plurality of threads.

Clause 8. The method of clause 7, further comprising: determining that a size of one of the respective partitions exceeds a threshold; and in response to the size exceeding the threshold, creating at least one additional kernel to process at least a portion of the one of the respective partitions.

Clause 9. The method of clause 7 or 8, wherein only one instance of the histogram is stored for each thread block and the plurality of threads correspond to the thread block.

Clause 10. The method of any of clauses 7-9, wherein building the histogram further comprises: assigning a respective set of the plurality of the sequences to each of the plurality of threads, each of the respective sets comprising at least two sequences; and in each of the plurality of threads: generating hashes for the respective set of the plurality of the sequences; and atomically adding the hashes to the histogram in the memory location.

Clause 11. The method of any of clauses 7-10, further comprising: allocating the buffer pool in the global memory; dividing the buffer pool into a plurality of pages; and assigning a respective page of the plurality of pages to each of the plurality of threads.

Clause 12. The method of clause 11, further comprising: determining that the respective page for one of the plurality of threads is full; and assigning another page of the plurality of pages to the one of the plurality of threads in response to determining the respective page is full.

Clause 13. A system comprising: a central processing unit; and a graphics processing unit communicably coupled to the central processing unit, the graphics processing unit configured to at least: receive input data comprising a plurality of sequences; generate a plurality of partitions from the plurality of sequences; sort each of the plurality of partitions in a different thread of a plurality of threads, wherein the plurality of threads store a respective output in a shared memory to generate a plurality of sorted sub-arrays; merge the plurality of sorted sub-arrays in parallel in the plurality of threads to generate a single sorted array; and transmit a result of a join operation to the central processing unit based at least in part on the single sorted array.

Clause 14. The system of clause 13, wherein merging the plurality of sorted sub-arrays comprises the graphics processing unit being configured to at least: iteratively find a merge path based on a parallel merge algorithm between two of the plurality of sorted sub-arrays; and merge the two of the plurality of sorted sub-arrays into a list.

Clause 15. The system of clause 14, wherein finding the merge path comprises performing binary searches along cross-diagonals of a matrix of the two of the plurality of sorted sub-arrays.

Clause 16. The system of clause 14 or 15, wherein the list is stored in a global memory.

Clause 17. The system of any of clauses 13-16, wherein the graphics processing unit is further configure to at least: load at least one chunk from one of the plurality of partitions into a plurality of registers corresponding to a thread; and perform a sequential odd-even sort of the at least one chunk.

Clause 18. The system of clause 17, wherein the at least one chunk is loaded as an array with static indexing into the plurality of registers.

Clause 19. The system of any of clauses 13-18, wherein the graphics processing unit is further configure to at least allocate an output buffer based at least in part on a prefix scan.

Clause 20. The system of any of clauses 13-19, wherein an execution of a kernel and a transfer of data occur simultaneously.

The invention claimed is:
1. A system comprising:
a central processing unit; and
a graphics processing unit communicably coupled to the central processing unit, the graphics processing unit configured to at least:
  receive input data comprising a plurality of sequences;
  initialize a histogram in a memory location shared by a plurality of threads;
  build the histogram of hash values for the plurality of sequences;
  reorder the plurality of sequences based at least in part on the histogram;
  perform a single probe using a respective partition in each of the plurality of threads;
  store a respective output corresponding to the single probe from each of the plurality of threads into a buffer pool in global memory; and
  transmit a result of a join operation to the central processing unit based at least in part on the respective output corresponding to the single probe from each of the plurality of threads.
2. The system of claim 1, wherein the graphics processing unit is further configured to:
  determine that a size of one of the respective partitions exceeds a threshold; and in response to the size exceeding the threshold, create at least one additional kernel to process at least a portion of the one of the respective partitions.

3. The system of claim 1, wherein only one instance of the histogram is stored for each thread block, the plurality of threads corresponding to the thread block.

4. The system of claim 1, wherein the graphics processing unit is further configured to build the histogram by:
assigning a respective set of the plurality of the sequences to each of the plurality of threads, each of the respective sets comprising at least two sequences; and
in each of the plurality of threads:
generating hashes for the respective set of the plurality of the sequences; and
atomically adding the hashes to the histogram in the memory location.

5. The system of claim 1, wherein the graphics processing unit is further configured to:
allocate the buffer pool in the global memory;
divide the buffer pool into a plurality of pages; and
assign a respective page of the plurality of pages to each of the plurality of threads.

6. The system of claim 5, wherein the graphics processing unit is further configured to:
determine that the respective page for one of the plurality of threads is full; and
assign another page of the plurality of pages to the one of the plurality of threads in response to determining the respective page is full.

7. A method of performing a data join at least in part in a graphics processing unit comprising:
receiving input data comprising a plurality of sequences;
initializing a histogram in a memory location shared by a plurality of threads;
building the histogram of hash values for the plurality of sequences;
reordering the plurality of sequences based at least in part on the histogram;
performing a single probe using a respective partition in each of the plurality of threads;
storing a respective output corresponding to the single probe from each of the plurality of threads into a buffer pool in global memory; and
outputting a result of a join operation based at least in part on the respective output corresponding to the single probe from each of the plurality of threads.

8. The method of claim 7, further comprising:
determining that a size of one of the respective partitions exceeds a threshold; and
in response to the size exceeding the threshold, creating at least one additional kernel to process at least a portion of the one of the respective partitions.

9. The method of claim 7, wherein only one instance of the histogram is stored for each thread block and the plurality of threads correspond to the thread block.

10. The method of claim 7, wherein building the histogram further comprises:
assigning a respective set of the plurality of the sequences to each of the plurality of threads, each of the respective sets comprising at least two sequences; and
in each of the plurality of threads:
generating hashes for the respective set of the plurality of the sequences; and
atomically adding the hashes to the histogram in the memory location.

11. The method of claim 7, further comprising:
allocating the buffer pool in the global memory;
dividing the buffer pool into a plurality of pages; and
assigning a respective page of the plurality of pages to each of the plurality of threads.

12. The method of claim 11, further comprising:
determining that the respective page for one of the plurality of threads is full; and
assigning another page of the plurality of pages to the one of the plurality of threads in response to determining the respective page is full.

* * * * *